United States Patent
Jones

(10) Patent No.: US 9,602,879 B2
(45) Date of Patent: Mar. 21, 2017

(54) INDEXING, ADVERTISING, AND COMPILING SPORTS RECORDINGS

(71) Applicant: David Allan Jones, Salt Lake City, UT (US)

(72) Inventor: David Allan Jones, Salt Lake City, UT (US)

(73) Assignee: Platypus IP, LLC, Lehi, UT (US)

( * ) Notice: Subject to any disclaimer, the term of this patent is extended or adjusted under 35 U.S.C. 154(b) by 0 days.

(21) Appl. No.: 15/057,114

(22) Filed: Feb. 29, 2016

(65) Prior Publication Data

US 2016/0269788 A1     Sep. 15, 2016

Related U.S. Application Data

(63) Continuation-in-part of application No. 14/750,824, filed on Jun. 25, 2015, now Pat. No. 9,277,282, which is a continuation of application No. 14/327,532, filed on Jul. 9, 2014, now Pat. No. 9,100,705.

(51) Int. Cl.
| | |
|---|---|
| *G11B 27/34* | (2006.01) |
| *H04N 21/2187* | (2011.01) |
| *H04N 21/274* | (2011.01) |
| *H04N 21/2747* | (2011.01) |
| *H04N 21/438* | (2011.01) |
| *H04N 21/478* | (2011.01) |
| *H04N 21/472* | (2011.01) |
| *H04N 21/433* | (2011.01) |
| *H04N 21/81* | (2011.01) |
| *H04N 21/482* | (2011.01) |

(52) U.S. Cl.
CPC ......... *H04N 21/4781* (2013.01); *G11B 27/34* (2013.01); *H04N 21/2187* (2013.01); *H04N 21/274* (2013.01); *H04N 21/2747* (2013.01); *H04N 21/438* (2013.01); *H04N 21/4334* (2013.01); *H04N 21/47217* (2013.01); *H04N 21/4821* (2013.01); *H04N 21/4825* (2013.01); *H04N 21/812* (2013.01); *H04N 21/8126* (2013.01); *H04N 21/8133* (2013.01)

(58) Field of Classification Search
CPC ......... H04N 21/47217; H04N 21/4334; H04N 21/2747; H04N 21/274; H04N 21/2187; H04N 21/4781
USPC ............................................. 725/24
See application file for complete search history.

(56) References Cited

U.S. PATENT DOCUMENTS

| | | | | |
|---|---|---|---|---|
| 7,458,093 | B2 * | 11/2008 | Dukes | H04L 29/06 725/112 |
| 8,176,518 | B1 * | 5/2012 | Junkin | H04N 21/4781 725/10 |
| 2007/0113250 | A1 * | 5/2007 | Logan | H04N 21/4781 725/46 |
| 2009/0082110 | A1 * | 3/2009 | Relyea | G07F 17/32 463/42 |
| 2009/0210395 | A1 * | 8/2009 | Sedam | H04W 4/00 |

(Continued)

*Primary Examiner* — Nathan Flynn
*Assistant Examiner* — Caroline Somera

(57) ABSTRACT

Several embodiments of present invention relate to indexing a real-life sports event with fantasy-related events occurring therein. Several embodiments also include defining portions of digital data recordings based on the occurrence of fantasy events. And, various embodiments relate to creating compilations of and/or access to video recordings based on occurrence of one or more fantasy events recorded therein.

18 Claims, 9 Drawing Sheets

(56) References Cited

U.S. PATENT DOCUMENTS

2015/0375117 A1* 12/2015 Thompson ............. A63F 13/35
463/9

* cited by examiner

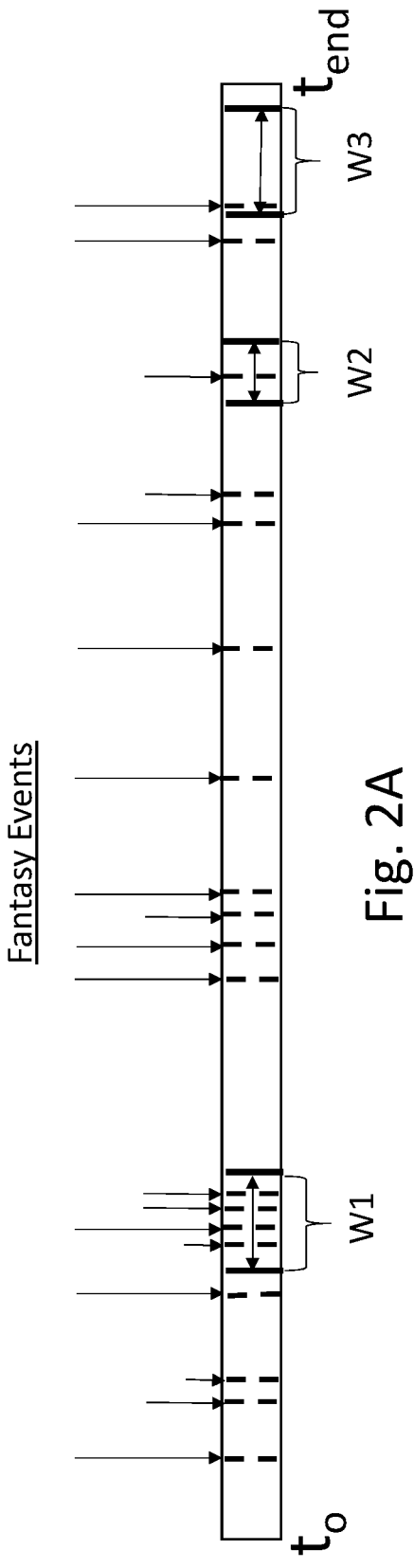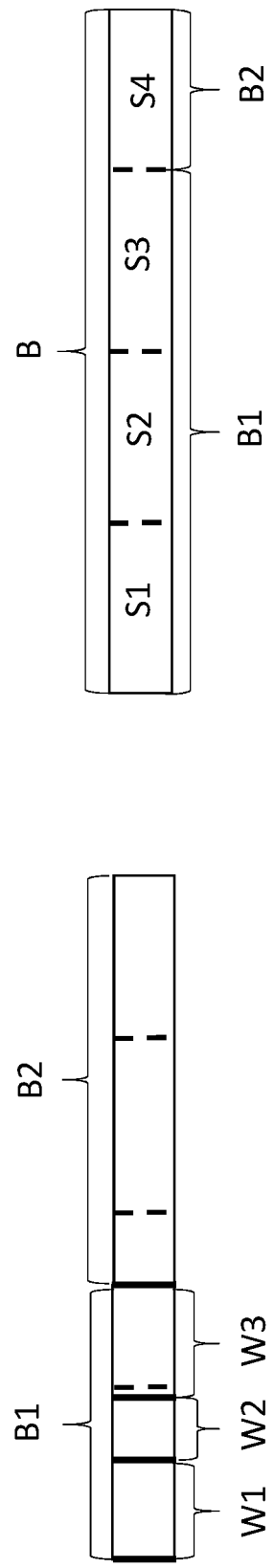
Fig. 2A
Fig. 2B
Fig. 2C

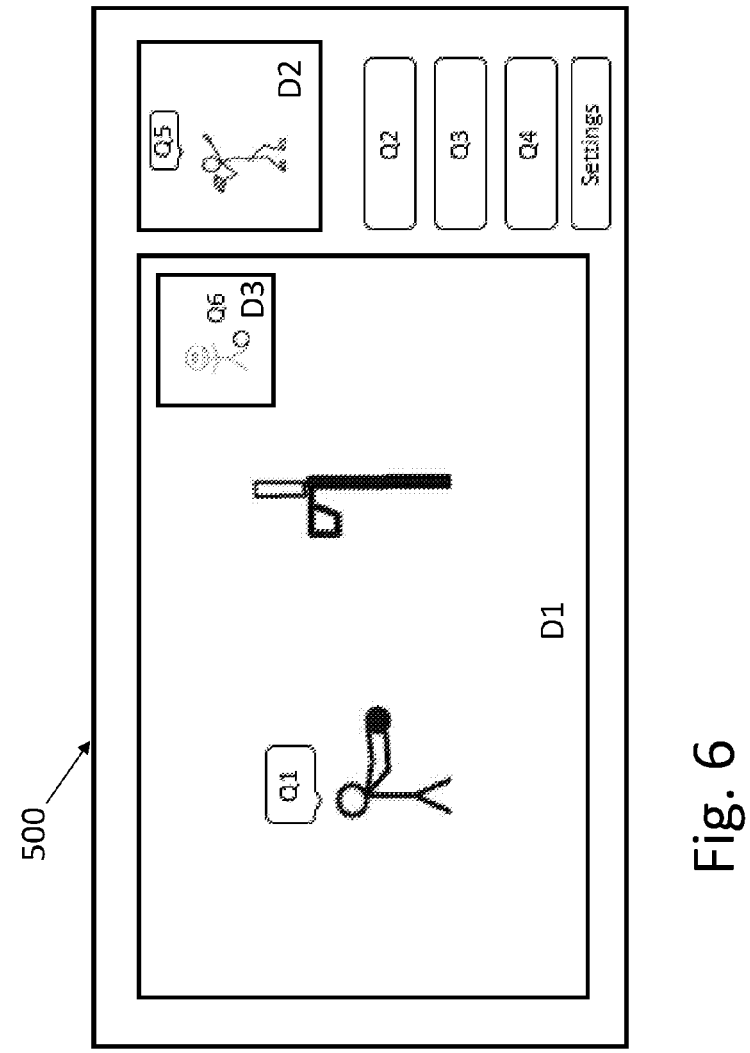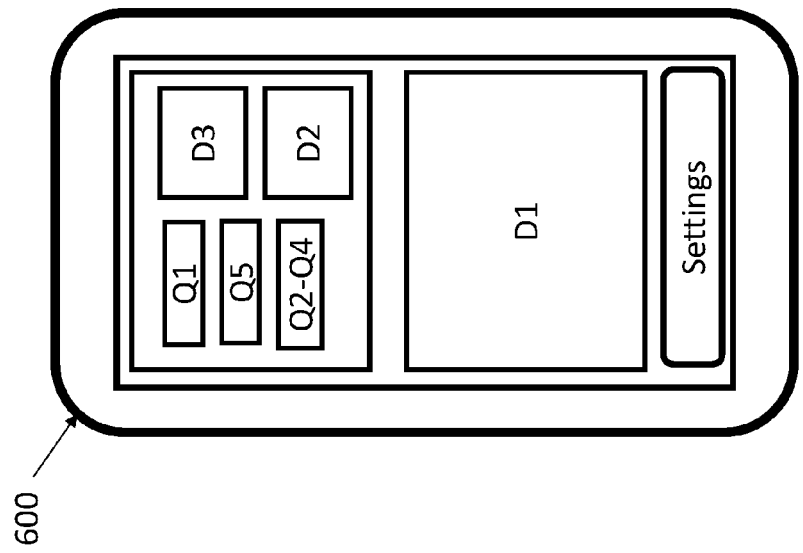
Fig. 6

Fig. 8

| Channel Names 201 | Channel Numbers 202 | 8:00pm | 8:30pm | 9:00pm | 9:30pm |
|---|---|---|---|---|---|
| AAA | 22 | Program A1 | Program A2 | Program A3 | Program A4 |
| ABA | 23 | Program B1 | Program B2 | | Program B3 |
| PAL | 24 | Program C1 | Program C2 | | Program C3 |
| LAP | 25 | | Program D1 | | Program D2 |
| LLL | 26 | Program E1 | Program E2 | Program E3 | Program E4 |
| ACK | 27 | Program F1 | Program F2 | Program F3 | |
| QFT | 28 | Program G1 | Program G2 | Program G3 | Program G4 |
| MCL | 29 | Program H1 | Program H2 | Program H3 | Program H4 |

Page 200 — Selectable Items 203 — Time Frames 204

INDEXING, ADVERTISING, AND COMPILING SPORTS RECORDINGS

CROSS-REFERENCE TO RELATED APPLICATIONS

This application is a continuation-in-part of U.S. patent application Ser. No. 14/750,824 filed Jun. 25, 2015, and entitled "Methods and Apparatus for Indexing and/or Advertising in a User Selected Downloaded Digital Video Recording" which is a continuation of U.S. patent application Ser. No. 14/327,532 filed Jul. 9, 2014 issued as U.S. Pat. No. 9,100,705 of the same title, the contents of both patent applications are hereby incorporated by reference herein.

BACKGROUND

A fantasy sport is a type of online game where participants assemble imaginary or virtual teams of real players of a professional sport. These teams compete based on the statistical performance of those players' players in actual games. This performance is converted into points that are compiled and totaled according to a roster selected by each fantasy team's manager. These point systems can be compiled and calculated using computers tracking actual results of the professional sport. In fantasy sports, team owners draft, trade and cut (drop) players, analogously to real sports.

Examples of fantasy sports include: daily fantasy sports, fantasy auto racing, fantasy baseball, fantasy basketball, fantasy boxing, fantasy congress, fantasy cricket, fantasy eSports—contests played based on the results of multiplayer online games such as League of Legends and Counter-Strike, fantasy F1, fantasy football (American), fantasy football (Australian rules football), fantasy football (e.g FIFA soccer and Association), fantasy golf, fantasy hockey, fantasy MMA, fantasy rugby league, fantasy sports stock simulations, fantasy surfing, fantasy professional wrestling.

Daily fantasy sports, an accelerated variant of the concept, began to experience a major increase in prominence in 2014 and 2015. Daily fantasy games are played across shorter periods of time, such as a single week of a season, rather than an entire season. Daily fantasy games are typically played as "contests" subject to an entry fee, which funds an advertised prize pool and is partially raked-off as revenue for the service. The daily fantasy market is saturated primarily by the two competing services DraftKings and FanDuel, which both received venture capital investments from various firms, including sports teams and broadcasters, and became known for running aggressive marketing campaigns with an emphasis on large cash prizes.

There are many different methods of organizing of fantasy football leagues, for example, some of which may be combined. The two most popular league types are head-to-head and total points leagues.

In head-to-head leagues, a fantasy team matches up against a different fantasy team from the league each week. The team that receives the most points of the two receives a win for that week. Points are dictated by the scoring system that is either standard set by the website or custom set by the league. A team's total is the sum of all players' points in the starting lineup. Teams with the best win-loss record advance to the playoffs. If two teams have the same record, tiebreakers are employed based on league preference.

Just as in real football, each year fantasy football leagues have a draft (in dynasty leagues, this normally consists of NFL rookies only), in which each team drafts NFL players. These players are kept unless they are traded or dropped, whereby they enter a pool of unowned players that any team may claim. In most leagues, no player may be owned by more than one team, although some leagues do allow for this.

In an auction draft, each owner has an imaginary budget which he must use to purchase all his players in an auction format. Owners take turns nominating players for open bid. The owner who bids the highest on each player receives that player, reducing their remaining budget accordingly. Auction drafts are viewed as the more fair method since every owner begins on equal ground. A few leagues use a hybrid of the two styles, selecting a portion of their roster via auction, with the remainder selected through a serpentine method.

Each owner assigns his/her team a name, which can be based on anything. Each team is allowed a pre-determined number of players on its team, as well as a specified number at each position that can or must be used in each game (the "starters"). Owners for each team then determine each week which players will start (within the rules) and which will be "benched". Just like in real football, bench players can become starters for various reasons: due to other players' injury, poor performance, or if another player's team has a bye.

Each week, owners choose their starters for a game before a certain deadline. Whether to sit or start a player is usually based on strategic considerations including the player's past and expected performance, defensive match ups, and so on.

Each team owner must designate which players from the team roster will be starters each week—i.e. the only players who will "score" any points. The following example is similar to many common formats required for a starting lineup:

1 Quarterback (QB)
2 Running Backs (RB)
2 Wide Receivers (WR)
1 Flex RB/WR/TEs (RB/WR/TE)
1 Tight End (TE)
1 Placekicker (K)
1 Team Defense/Special Teams (D/ST)
6 Bench (BN)

There are many variants on this. Some leagues use individual defensive players (IDPs) (and in some cases a punter) instead of or in addition to a combined Team Defense/Special Teams. Some other leagues use separate Defense and Special Teams. Another variant is the "flex" position, which can be filled by a player in one of several positions. Flex positions are often limited to "WR/TE", "RB/WR", or "RB/WR/TE". Traditionally, this flex was required to be an RB, WR, or TE; however, some leagues allow any position to fill this flex slot as an "OP" (any Offensive Player).

League managers earn their team points based on their starting players' performances in weekly NFL games. Players accumulate points based purely on their statistical output. For example, a touchdown might be worth six points while each yard passed, rushed, or carried may be worth a certain amount of points, and so on. In most cases, players earn points for passing, rushing, and receiving yards.

Although kickers can theoretically score points through touchdowns or yards rushed and received, they accumulate most of their points through field goals and extra points. The Team Defense/Special Teams position earns points through defensive plays (such as turnovers, quarterback sacks, safeties, and blocked kicks) and by limiting the offensive points of the opposing teams. Also, whereas points are awarded to players for positive plays, points are taken away from players for negative plays such as turnovers or missed kicks.

The standard fantasy football scoring system comprises a well-respected baseline of statistic/point-value pairs designed to promote balance across the various fantasy positions. This is the typical scoring configuration chosen by first time fantasy football commissioners because it is a very basic points system which is fair and intuitive for fantasy novices.

A typical standard scoring format would look very similar to this, although there may be slight discrepancies in points awarded to kickers (depending on your league host's scoring limitations):

1 point for 25 passing yards
1 point for 10 rushing yards
1 point for 10 receiving yards
6 points for a touchdown
4 points for a passing touchdown
−2 points for every interception thrown or fumble lost
1 point for each extra point made
3 points for each 0-39 yard field goal, 4 points for each 40-49 yard field goal, and
5 points for each 50+ yard field goal
2 points per turnover gained by defense
1 point per sack by the defense
2 points for a safety by defense
6 points for each touchdown scored by defense
2 points for each blocked kick Points-per-reception leagues were created as an effort to make wide receivers and tight ends more relevant to fantasy scoring. In this alternate scoring system, fractional or full points are awarded for every reception tallied by a player. This changes the value of players in standard scoring systems, as running backs who catch many passes become more valuable, those who catch fewer are less valuable, and so on. Certain leagues vary the points respective positions earn for receptions.

Another scoring system counts only touchdowns, touchdown passes, and field goals for points. Many of the first fantasy football leagues were pure-scoring leagues as this provided for easier tracking of team points throughout the season. As the game matured and moved online, it became easier to track yardage and more sophisticated scoring configurations were adopted.

An alternate scoring format is the "pure yardage" league, in which touchdowns are ignored, and each player's passing, rushing and receiving yards are totaled. Some yardage leagues also convert defensive stats into yards (ex., 50 yards for an interception, 20 yards for a sack), whether for a team's defense, or individual players.

An alternative method for scoring defense is Individual Defensive Players or IDP fantasy football. The main difference being that players typically draft anywhere from 3 to 7 individual defensive players during a draft as opposed to just one team defense. Sometimes there are required positions to fill like 2 Linebackers, 2 Defensive Backs and 2 Defensive Linemen and sometimes it's just 5 defensive players of any position you choose. There are many different ways to draft IDPs and many have found this makes the later part of the fantasy draft more exciting. For instance, instead of drafting a 5th wide receiver in the 16th round that will typically be on your bench or dropped part way through the season, you are instead drafting a "full-time" starting defensive player that can help you win your league.

Some leagues allow bonuses to be awarded to players for exceptionally good performances, like a QB throwing for over 300 yards. Running backs or wide receivers could similarly be awarded a performance bonus based on accumulating more than 100 yards on the ground or through the air. Kickers could even be awarded for long field goals, generally 50 yards or longer.

The way a fantasy owner watches a game is greatly affected if a player on their team is playing. An owner will root for specific things to happen in order for their player(s) to score points. For example, someone who has a running back will root for a goal line situation or for the team the running back plays for to be up by a significant amount of points. If the running back's team is on the goal line, then a running play is more likely to be called. If the running back's team is up by a significant amount of points, his team will call more running plays in order to run out the clock. The more running plays called, the more points for that running back. Different scenarios will provide certain players an opportunity to score points for fantasy owners.

A digital video recorder (DVR), sometimes referred to by the merchandising term personal video recorder (PVR), is a consumer electronics device or application software that records video in a digital format to a disk drive, USB flash drive, SD memory card, SSD or other local or networked mass storage device. The term includes set-top boxes (STB) with direct to disk recording facility, portable media players (PMP) with recording, TV gateways with network and local recordings, recorders (PMR) as camcorders that record onto Secure Digital memory cards and software for personal computers which enables video capture and playback to and from a hard disk drive. A television set with built-in digital video-recording facilities was introduced by LG in 2007, followed by other manufacturers.

Consumer digital video recorders ReplayTV and TiVo were launched at the 1999 Consumer Electronics Show in Las Vegas, USA. Microsoft also demonstrated a unit with DVR capability, but this did not become available until the end of 1999 for full DVR features in Dish Network's DISHplayer receivers. TiVo shipped their first units on Mar. 31, 1999. ReplayTV won the "Best of Show" award in the video category with Netscape co-founder Marc Andreessen as an early investor and board member, but TiVo was more successful commercially. While early legal action by media companies forced ReplayTV to remove many features such as automatic commercial skip and the sharing of recordings over the Internet, newer devices have steadily regained these functions while adding complementary abilities, such as recording onto DVDs and programming and remote control facilities using PDAs, networked PCs, and Web browsers.

Hard-disk based digital video recorders make the "time shifting" feature (traditionally done by a VCR) much more convenient, and also allow for "trick modes" such as pausing live TV, instant replay of interesting scenes, chasing playback where a recording can be viewed before it has been completed, and skipping of advertising. Most DVRs use the MPEG format for compressing the digitized video signals. Video recording capabilities have become an essential part of the modern set-top box, as TV viewers have wanted to take control of their viewing experiences. As consumers have been able to converge increasing amounts of video content on their set-tops, delivered by traditional 'broadcast' cable, satellite and terrestrial as well as IP networks, the ability to capture programming and view it whenever they want has become a must-have function for many consumers.

At the 1999 CES, Dish Network demonstrated the hardware that would later have DVR capability with the assistance of Microsoft software. which also included WebTV Networks internet TV. By the end of 1999 the Dishplayer had full DVR capabilities and within a year, over 200,000 units were sold.

Many satellite, cable and IPTV companies are incorporating digital video recording functions into their set-top box, such as with DirecTiVo, DISHPlayer/DishDVR, Scientific Atlanta Explorer 8xxx from Time Warner, Total Home DVR from AT&T U-verse, Motorola DCT6412 from Comcast and others, Moxi Media Center by Digeo (available through Charter, Adelphia, Sunflower, Bend Broadband, and soon Comcast and other cable companies), or Sky+. Astro introduced their DVR system, called Astro MAX, which was the first PVR in Malaysia but was phased out two years after its introduction.

In the case of digital television, there is no encoding necessary in the DVR since the signal is already a digitally encoded MPEG stream. The digital video recorder simply stores the digital stream directly to disk. Having the broadcaster involved with, and sometimes subsidizing, the design of the DVR can lead to features such as the ability to use interactive TV on recorded shows, pre-loading of programs, or directly recording encrypted digital streams. It can, however, also force the manufacturer to implement non-skippable advertisements and automatically expiring recordings.

In 2003 many Satellite and Cable providers introduced dual-tuner digital video recorders. In the UK, BSkyB introduced their first PVR Sky+ with dual tuner support in 2001. These machines have two independent tuners within the same receiver. The main use for this feature is the capability to record a live program while watching another live program simultaneously or to record two programs at the same time, possibly while watching a previously recorded one. Kogan.com introduced a dual-tuner PVR in the Australian market allowing free-to-air television to be recorded on a removable hard drive. Some dual-tuner DVRs also have the ability to output to two separate television sets at the same time. The PVR manufactured by UEC (Durban, South Africa) and used by Multichoice and Scientific Atlanta 8300DVB PVR have the ability to view two programs while recording a third using a triple tuner.

Where several digital subchannels are transmitted on a single RF channel, some PVRs can record two channels and view a third, so long as all three subchannels are on two channels (or one).

BRIEF DESCRIPTION OF THE DRAWINGS

FIGS. 2A, 2B, and 2C illustrate a compilation of a "dwindling" recording buffer;

FIG. 6 illustrates a portable fantasy interactive device for use with a television including fantasy features;

FIG. 8 illustrates an example page of a user interface (UI) screen for an electronic program guide (EPG) data according to an embodiment.

DESCRIPTION OF EXAMPLE EMBODIMENTS ILLUSTRATING THE INVENTION

Several embodiments of present invention relate to indexing a real-life sports event with fantasy-related events occurring therein. Several embodiments also include defining portions of digital data recordings based on the occurrence of fantasy events. And, various embodiments relate to creating compilations of and/or access to video recordings based on occurrence of one or more fantasy events recorded therein.

Figure 1:
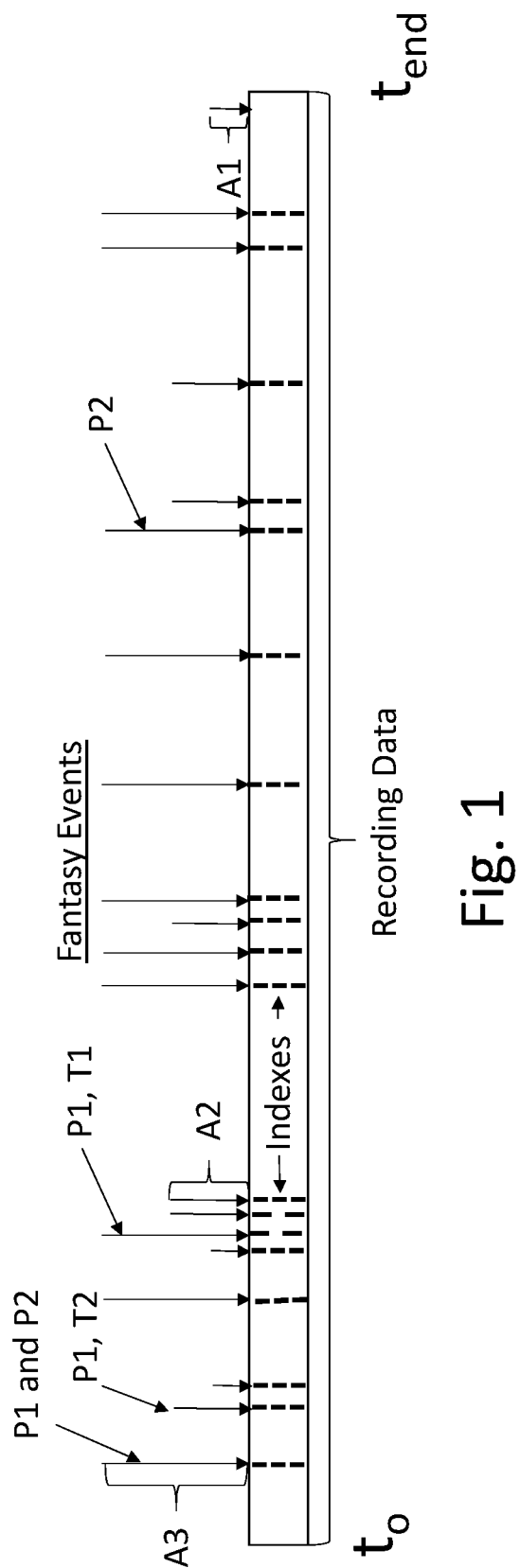
FIG. 1 illustrates a digital video recording including a plurality of defined fantasy events therein.

For example, referring to FIG. 1, a real-life sports event can be a real-life sporting game defined by a beginning of the real-life sports event at $t_o$ and an end of the real-life sports event at $t_{end}$. n the example of a football game, the beginning can be a kick-off and the end may be the point at which the game is over and the final score is known or time on a clock runs out. During the game certain "fantasy events" occur, such as a goal, score, accumulation of yards, etc. and these fantasy events shown by downward arrows in FIG. 1 define a position within the recording of the event at which each fantasy event occurred. As described hereafter in more detail, these fantasy events can be used to index recordings and can also be used to define other attributes of the recordings of the real-life events based on the fantasy events recorded therein.

The fantasy-related events of which the indexing can be based can correspond with a fantasy team owner's fantasy team players. The fantasy-related events of which the indexing can be based can consider a fantasy scoring system of a fantasy league which the fantasy team and fantasy team owner is a member. The fantasy-related events of which the indexing can be based can consider a current fantasy matchup (e.g. a specific fantasy opponent) of the fantasy team and the fantasy owner in the fantasy sport league. The fantasy indexing can be defined by one fantasy event or a group of fantasy events having a fantasy "volume" or fantasy "density" of events.

The fantasy events can include a fantasy game point generating event. The fantasy game event can be associated with an active fantasy roster of a particular team manager. The team associated with the team manager can include a list of active fantasy players and a list of inactive fantasy players on the fantasy team bench. The active fantasy players can be the only players that generate fantasy events. The inactive fantasy players can also generate fantasy bench events that are not associated with the same group or class of events as the active fantasy team players.

A fantasy event can be associated with a particular active fantasy player (e.g. P1 and/or P2) associated with the fantasy event. The fantasy event can also be associated with a particular fantasy team (e.g. T1) of which the fantasy player (e.g. P1 and/or P2) is an active fantasy rostered player. The fantasy event can be associated with the particular live sporting event within which the fantasy event occurs. And, the fantasy event can be associated with a time of the occurrence of the fantasy event in the live recording of the real-life sporting event.

The fantasy events can be governed by the rules of a particular fantasy league to which the fantasy manager is a member and has a fantasy team therein. The fantasy events can be associated with a fantasy event amplitude (e.g. A1, A2, and A3). The rules of the particular fantasy league govern when and how many points are received by a fantasy team upon occurrence of a fantasy event. For example, in the case of a fantasy football scoring scheme regarding passing from a quarterback, fantasy events include a touchdown pass, a number (e.g. 25) of passing yards, a two point conversion, and an interception thrown. There can also be custom passing events defined by the league such as a number of points assigned for 1, 5, 10, 20, 25, 50, and 100 passing yards. There can be points assigned for an increment of completions (e.g. 1, 5, 10, etc.). There can be points taken from a fantasy team due to a number of incomplete passes (e.g. 1, 5, 10, etc.). There can be a custom or bonus fantasy event associated with a distance of touchdown pass (e.g. 40+ yard TD pass bonus, 50+ yard TD pass bonus, etc.). There can be a fantasy event associated with a total passing yards of a quarterback (e.g. 300-399 yard passing game, 400+ yard passing game, etc.). A quarterback can also receive a fantasy event related to each pass attempted or a quarterback can also receive a fantasy event related to each time the quarterback is sacked. Thus, the active quarterback of the particular fantasy team can be associated with fantasy events associated with the fantasy league rules, activities of the active quarterback, and/or points generated in the fantasy league. In fact, the assignment of points to the quarterback or other active fantasy player can be used as a trigger to identify a fantasy event in a live or recorded real-life sports event.

Regarding active running backs of the particular fantasy manager's fantasy football team, the active running backs can be associated with fantasy running back events. The running back fantasy events can also be associated with a fantasy team to which the manager of the particular fantasy team and active fantasy running back is assigned. The active fantasy running back corresponds to a real-life running back whose statistics in real life generate the fantasy statistics in the fantasy league. For example, an active fantasy running back can receive six points for a rushing touchdown and one point for each 10 rushing yards. As such, upon scoring a rushing touchdown, a fantasy event is generated associated with the rushing touchdown and the particular fantasy team to which the fantasy running back is active. The rushing fantasy event can include a two point conversion rush by the active fantasy running back. According to various custom or optional fantasy events that can be identified particular to a fantasy league, a rushing fantasy event can occur upon a running back accruing a certain number of yards (e.g. every 5, 10, 20, 25, 50, 100, etc. rushing yards), a certain number of rushing attempts (e.g. every 5, 10, etc. rushing attempts), a 40+ yard touchdown rushing event, a 50+ yard touchdown rushing event, a 100-199 yard rushing game, and a 200+ yard rushing game. Any of these events can be identified as a fantasy event based on the real-life activity of a real-life running back associated with an active player running back of a particular fantasy team associated with a particular fantasy team manager.

Similar fantasy events can occur for fantasy receiver events including receptions, yard, two point conversion, yard increment accrual, touchdown reception distance, and so forth. A special teams event can include a kickoff return, punt return, fumble recovery for a touchdown, fumble recovery itself, a fumble lost, accrual of kickoff return yards, punt return yard, a fumble recovered for a touchdown, and a fumble lost. Similarly, a fantasy kicker event can be recorded. The fantasy kicker event can include a field goal made, and/or a field goal of a certain distance associated with a particular fantasy attribute assigned to the event. An extra point event and a missed kick fantasy event. A defensive fantasy event can be associated with a number of yard made or points scored against the defensive team. The defensive fantasy event can include an interception, sack, safety, blocked punt, and can be a graduated number of fantasy points.

The fantasy event can be assigned the fantasy magnitude (e.g. A1, A2, A3). The fantasy magnitude can be associated with a particular amount of fantasy points associated with the fantasy event. For example, where the fantasy event is associated with two points, the fantasy magnitude assigned thereto can be larger, or twice as large, as a fantasy event associated with a single fantasy point and so forth.

The fantasy event can be associated with a fantasy event threshold. For example, a fantasy event magnitude below a predetermined fantasy event threshold can be ignored for purposes of indexing, alerting, advertising, clipping, or compiling. The fantasy event threshold can include multiple fantasy event thresholds. The multiple fantasy event thresholds can be associated with a fantasy event response or logging. For example, where the fantasy event threshold is met, more attention can be automatically made to the fantasy event for summarization or compilation. For example, in the instance where the compilation of a video clip or portion is associated with the fantasy event, a longer recording window can be assigned to the fantasy event based on the fantasy magnitude of the event or threshold met by the fantasy event.

The fantasy event can also be assigned a fantasy event type. For example, the fantasy event related to a fantasy reception or rushing touchdown can be assigned a higher magnitude of fantasy weight than an accumulation of yards irrespective of the number of fantasy points associated thereto as the fantasy event type might be more prone to be reviewed, summarized, compiled along with other fantasy events, etc. The fantasy magnitude and fantasy type can also be used in an algorithm to define the fantasy event and the defined fantasy event can be compared with other fantasy events to determine a level of fantasy event. The comparative level of fantasy event can be compared to the fantasy threshold to determine the action taken regarding the fantasy event. And, as previously discussed, a decision as to whether to index, identify, capture, record, or compile recordings and information about the fantasy event can be made on this basis.

A fantasy event can be captured via a video and/or audio recount of the fantasy event. For example, referring to FIG. 2, upon logging a fantasy event a fantasy event window (e.g. W1 and W2) of a real-life recording of the fantasy event can be defined. The fantasy event window W can include a certain recording time frame prior to the fantasy event and a certain recording time frame after the occurrence of the fantasy event. The fantasy event window W can depend on the fantasy event type. For example, where the fantasy event type includes a touchdown pass by a fantasy team quarterback, the fantasy event recording window can include a certain time prior to the fantasy event and a certain time after the fantasy event so as to capture the fantasy event within the fantasy event type of window W of recording.

The fantasy event window W can be defined within a recording buffer B for recording video data. The recording buffer B of one or more windows W can be a DVR recorded buffer B, or queue, of recording memory. The fantasy recording buffer B can include a recording of a real-time event. The recording of the real-time event can be stored in a queue, or buffer B, which can be a first in first out (FIFO) queue. As the real-time recording is made within the buffer, the recording of real-time media can be placed into the buffer and past recording can be removed from the buffer in a first-in-first-out basis.

For example, referring to FIG. 2C, the real-life recording can be recorded to a buffer B of 40 minutes in this example and this real-life recording buffer of 40 minutes can be divided into segments S1, S2, S3, and S4 each of 10 minutes of recording size each. Longer and shorter buffers B as well as longer and shorter increments can be defined within the buffer and can be adaptive and changed according to criteria. Certain Codec and conversions may be used to increase and decrease the buffer size, and such recording data structures can be associated with recording location as discussed in further detail below. Regarding the 40 minute buffer B with 10 minute increments S illustrated in FIG. 2C, a first ten minute increment is recorded in segment S1. After the first ten minute increment in segment S1 is recorded, an index is made within or associated to the 10 minute recording as illustrated. At the end of this 10 minute recording of segment S1, a second ten minute recording of segment S2 is started simultaneous with the first 10 minute recording of segment S1 ending. The first ten minute recording of segment S1 can be stored as a data file in memory and may be referred to as a second time increment buffer recoded file.

The second real-time recording S2 continues to be recorded after the first ten minute increment recording S1 is stored. Upon the second real-time recording finishing a ten minute increment S2, the second real-time recording S2 is finished, stored, and indexed or otherwise identified.

This buffer recording scheme continues for a third segment S3 and fourth ten minute segment increment S4 until the buffer of four ten minute increments S1-S4 is full according to this example. When the buffer of four ten minute increments S1-S4 is full in that a fourth ten minute increment S4 finishes, the first of the four ten minute increments S1 is deleted or stored elsewhere, such as transmitted over the internet to a cloud or off-site storage mechanism. Thus, after the buffer B is full, a most-old increment of recording (e.g. S1) is deleted, transmitted off-site or to another electronic storage device, or stored to a different local storage medium along with any indexes, advertising or other media inserted therein, or for other purposes.

As such, once the buffer B is full, but new real-life broadcast recordings are made, the oldest recording (e.g. S1) is eliminated from the buffer for the sake of storing a new increment of recording. Thus, in this example, the electronic device recording the real-life broadcast need only retain 40 minutes of real-life broadcast recordings. And, in this example the recordings are updated in ten minute increments with only the four increments of ten minutes immediately available for immediate access by the digital recording device from the particular storage media holding the short-term (40/10) minute recordings.

As previously discussed, when a fantasy event is noted, an index or advertisement can be placed in, or associated with, an increment of the real-time recording as illustrated in FIG. 2B so a buffer B or window W can include mut. The fantasy event can include an index pointing to a time in the recording of note of the fantasy event. The fantasy event can include an advertisement appended, inserted and/or overlaid in the digital recording at, or around, a point of a fantasy event. The fantasy events can note the window (e.g. W1, W2, and W3) surrounding the fantasy event within the digital video increment of recording. These notes can be fantasy windows, or fantasy-increments of digital video, defined within the increment of real-life recording.

These windows W of a fantasy event recording can be identified for user notification and/or selection as discussed later herein in further detail. Upon the selection, the user, such as a fantasy team owner, can be allowed to view the fantasy team window W (e.g. a defined video clip) of video associated with the fantasy event. The fantasy team owner can view the portion of the fantasy event window W of the video increment according to an index, or the portion of the fantasy window W of the video increment can be "clipped" or separated from the rest of the recording for display to the fantasy team owner.

When the fantasy window W or video increment is clipped, it can be sorted and stored separately according to a fantasy team associated data file (e.g. B1). The fantasy window (e.g. W or B1) of recorded digital video data can be associated with the fantasy team, type of fantasy event, magnitude of fantasy event, real-life player, team, or other real-life attribute associated with the fantasy event. The windows W may be selectively displayed and/or the buffer B1 may be selectively displayed upon a fantasy clip notification being displayed to the user as the real-life sporting event is recorded.

The fantasy event recording (e.g. the buffer window B1 of digital video recording surrounding the capture of the fantasy event windows W1, W, and W3) can be associated with other fantasy event recordings according to the fantasy team, real-life athlete associated with the fantasy event, a fantasy league, and the points/magnitude/type of the fantasy event.

For example, regarding a fantasy passing event by the fantasy quarterback, the fantasy event window W can extend from five, ten, fifteen or twenty seconds prior to the fantasy event and five, ten, fifteen, or twenty seconds after the fantasy event. Where the quarterback passing fantasy event is also associated with a receiver reception fantasy event, the window W of both fantasy events can be the same or the window can be different.

The window W associated with a passing event can be defined manually, automatically or semi-automatically. For example, a fantasy event can be triggered by the assignment of points to the associated fantasy player. The trigger can include a manual trigger of the recognition of the fantasy event occurrence. The occurrence of the fantasy event can be review in a recently recorded (e.g. akin to a sport playback) recording and a time of occurrence of the event can be defined therein. The identification of the fantasy event can be related to a center point with a fantasy event window automatically or semi-automatically defined around this fantasy event center point.

For example, a first real-life sports recording window W can be indexed based on a fantasy-related events that occur in the real-life sports recording. The fantasy related events can include a score, accumulation (or loss) of yards, a touchdown, for example.

Figure 3:
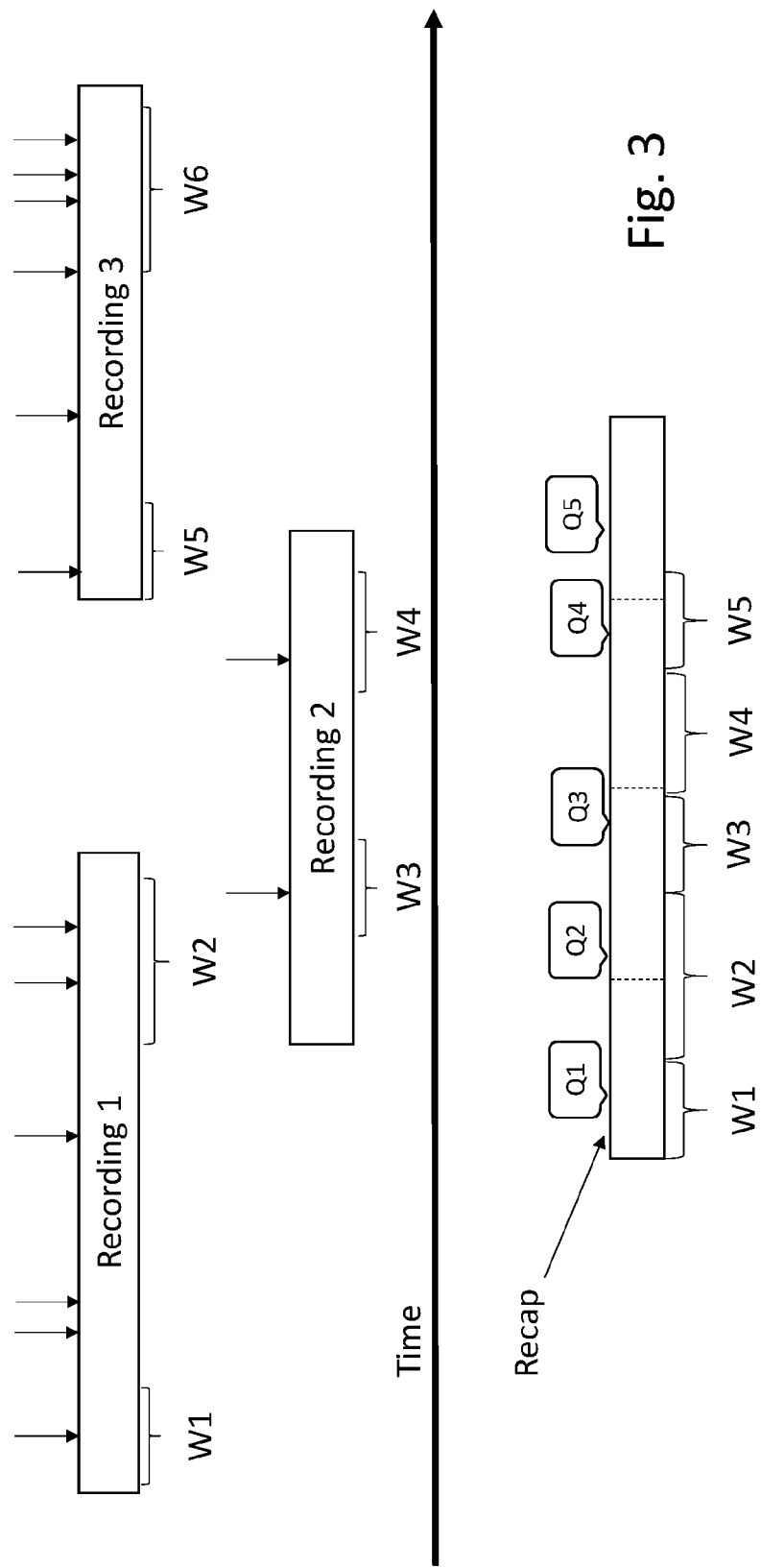
FIG. 3 illustrates a compilation process and data structure from multiple digital video recordings at least partially occurring simultaneously in-time and having defined fantasy events occurring therein.

Digital video data can also be organized according to a fantasy digital video recap as illustrated in FIG. 3. The fantasy digital video recap can be compiled using multiple fantasy events. The multiple fantasy events each be part of a fantasy group of events. A fantasy group of events can be organized according to a fantasy team. The fantasy group of fantasy events can be organized according to a fantasy league. The fantasy group of fantasy events can be organized according to a fantasy team owner. The fantasy group of fantasy events can be organized according to multiple fantasy teams of a fantasy team owner in different leagues and aggregated as a compilation of the fantasy events within different leagues for the particular fantasy team owner.

The fantasy events can be organized by time. For example, a first fantasy event may have occurred in a first Sunday morning NFL game and a second fantasy event may have occurred in a second Sunday afternoon NFL game that was after the first fantasy event and the first Sunday morning NFL game. Thus, the second fantasy event is later "in-time" in real-life than the first fantasy event. The second fantasy event may also have occurred in the same game as the first fantasy event, but later in-time to the first fantasy event. And, there can be many fantasy events from many real-life sports events that occur over-time and over different days, games, and even weeks or a season. Thus, these fantasy events can be organized according to their real-life time of occurrence.

The fantasy events, and recorded digital video associated thereto, can also be organized according to fantasy league events. A fantasy league event can be a particular matchup between fantasy teams of the same fantasy league. A fantasy league event can be a change in points between the two head-to-head competing fantasy teams, for example. The fantasy league event can be an occurrence of a fantasy event related to a first fantasy team as that fantasy event relates to a second fantasy team.

For example, where the first fantasy team and the second fantasy team are directly competing against one another, a fantasy event associated with the first fantasy team may be associated with the second fantasy team. These events of the first fantasy team may be used to compile digital video windows and clips about the first fantasy team with digital video windows and clips about the second fantasy team. These compilations of digital video windows and clips from fantasy events associated with the first and second fantasy teams maybe provide and/or presented and/or otherwise displayed or made accessible to the first and second fantasy team owners. These compilations of the digital video recordings related to fantasy events can be made based on any of the criteria for weighting the digital video recordings associated with the fantasy events as previously discussed.

Thus, digital video "clips" of digital video recordings can be compiled as a fantasy recaps of fantasy events on many basis and criteria. These digital video fantasy recaps can be associated with the particular fantasy team, fantasy owner, and/or fantasy league aspect. The digital video fantasy recaps can also, or separately, be associated with a particular real-life athlete whose statistics define fantasy points and fantasy events.

A fantasy clip, such as a window W, buffer B1, and/or recap may also be made assessable when the fantasy event occurs. The fantasy clip may be associated with a fantasy event notification. For example, referring to FIG. 3, the fantasy event notifications Q1, Q2, Q3, Q4, and Q5 can be associated with a time of one or more fantasy events and/or fantasy window W clips surrounding fantasy events. And, in some embodiments, the fantasy notification Q can include a pop-up window, email or other media that notifies the fantasy team owner, or another of the fantasy event. Upon presentation of the fantasy notification Q, the fantasy team owner can select the fantasy event notification Q and be presented with a fantasy event clip of digital video depicting the fantasy event such as data stored within a window W. For example, as previously discussed, the fantasy event associated with the fantasy digital video clip can be displayed to the fantasy team owner immediately upon selection of the fantasy notification Q by the fantasy team owner. The fantasy team notification Q can be presented to the fantasy team owner as soon as the fantasy team event is identified and the fantasy event clip of digital video is defined. The fantasy notification Q may also be presented while a window W of media is being recorded as part of that clip window W. The window of recording may include video prior to the occurrence of the fantasy event and video after the occurrence of the fantasy event as shown. The notification Q can pop-up and be selected by the user. At this point the user can be redirected or a sub-window/screen can be displayed that shows the clip window associated with the event. The user may navigate within the window clip up to the point that the clip window ends as which point the displayed sub-window associated with the fantasy window can be selectively or automatically removed or otherwise now longer displayed.

Thus, according to the example illustrated in FIG. 3, the real-life sports events occur in real-life. As the real-life event is being recorded, a fantasy buffer recap is being recorded of the real-life event. The fantasy buffer recap can include a buffer frame, such as 40 minutes, and the buffer frame can be divided into 10 minute increments as an example. Of course, frames/buffer/increments of seconds, 1, 2, 3, 4, 5, 10, 60 minutes, 2 hours, or a day, or defined by the time of the game, quarter, half, etc. can also be used.

Each real-life fantasy event triggers the recording of a fantasy digital video event window W. The real-life fantasy event is associated with a real-life time of the fantasy event and the fantasy event is associated with a location within the recorded digital video of the fantasy event according to the time thereof or other placement identified within the digital video recording (e.g. Recordings 1-3). The real-life fantasy event triggering the designation of the window W can also result in the clipping of the window W of data. The clips of fantasy data can be compiled, rearranged, and selectively presented to the user in a fantasy recap compilation of clips associated with fantasy events.

Figure 4:
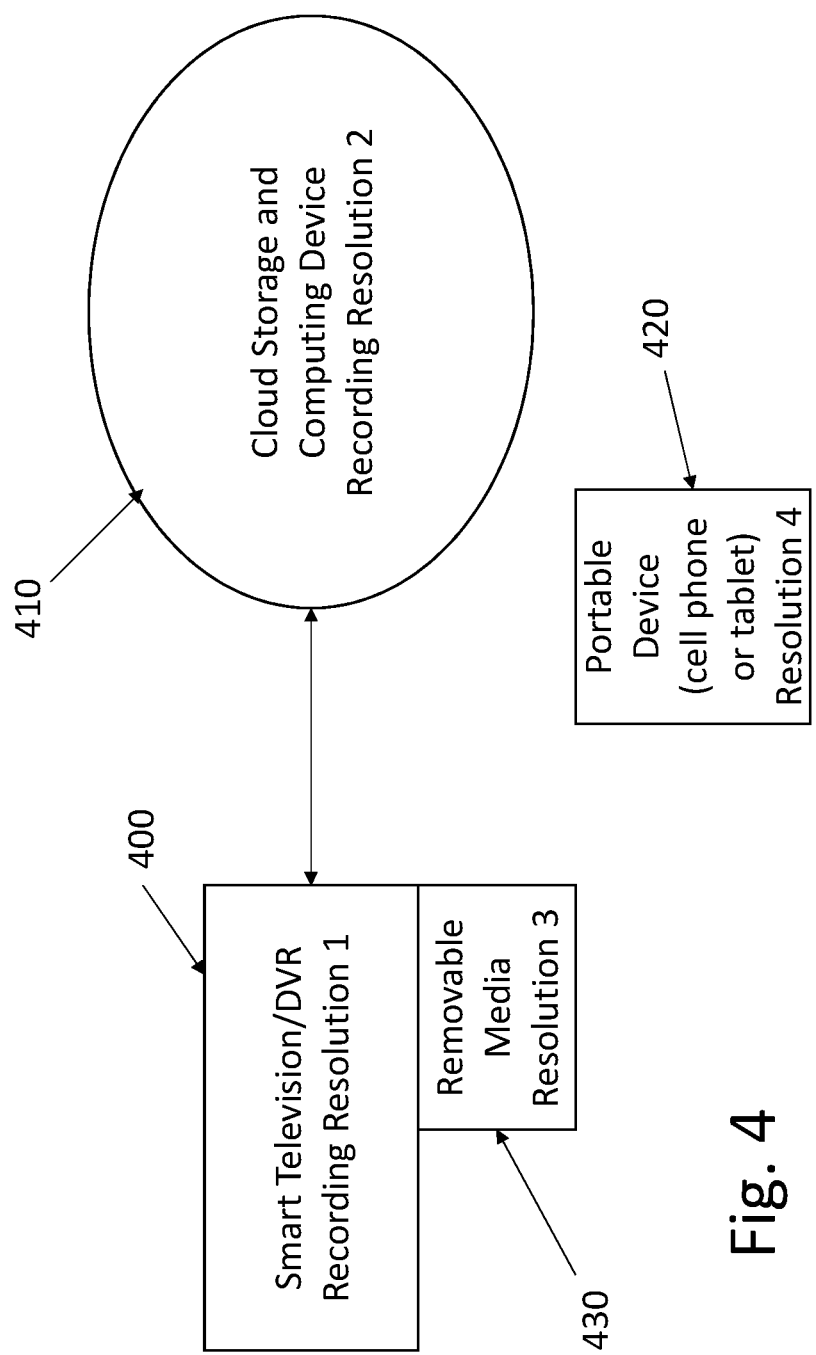
FIG. 4 illustrates a system for recording fantasy events.

Various embodiments of the invention consider resolution specific data structures based on the media data storage device of the data for digital video playback. For example, as shown in FIG. 4, a digital smart television 400 is illustrated. The digital smart television 400 can include a storage memory and a digital video recording application in the form of software. The digital smart television 400 can include a relatively low amount of data storage capability in particular compared to storage of large amounts of video data of high quality of resolution.

As such, the digital smart television 400 can be coupled via a network (including wireless and/or wired connections) to a cloud computing device 410 such as a cloud server. The cloud computing device 410 can include data storage media that enables "off-loading", backup or further processing of digital video data recorded by the smart television 400.

The smart television 400 is coupled to removable storage media 430. The removable storage media 430 can be a removable digital video recorder 430. The removable storage media 430 can be a flash storage media 430 or other form of RAM.

The smart television 400 is coupled to a portable device 420 such as a cell phone or a tablet 420. The cell phone or tablet 420 also includes storage media for storing digital video recordings.

The smart television 400, removable media 430, cloud storage 410, and/or portable device 420 each have a different resolution of data stored thereon and different features and indexes associated thereto. For example, the smart television 400 can store a relatively low resolution digital video recording as compared to the cloud storage device 410. The smart television 400 might include the buffer B previously disclosed and as portions of the buffer B are overwritten or deleted to make room for new high resolution recordings the removed or overwritten portions can be transmitted to the cloud computing device 410.

Similarly, as a fantasy clip, window, or recap is made, this data file can be stored to the removable media 430, for example, or backed-up on the cloud 410 or made accessible thereon for another member of a fantasy league.

The recorded media can be compressed for transmission, storage and/or display purposes. For example, the recorded media can be compressed whenever stored on the removable media 430 and/or transmitted to the portable device 420. In the instance of transmission to the portable device from the smart television 400, the resolution can likewise be decreased resulting in a smaller file size for display on the relatively smaller screen of the portable device 420.

The portable device 420 may also be in remote communication with the cloud storage device 410 and/or the smart television 400 via a wireless connection. The settings of the smart television 400 can be modified and/or controlled by the user of the portable device 420. The portable device 420 can also be used to make fantasy modifications to the team and/or recording settings including resolution of the recorded media.

The portable device 420 may also be in remote communication with an online fantasy betting option, and modification of the betting settings thereto can be used to indicate a fantasy event based on the online fantasy betting aspects disclosed herein. Similar to the aspects discussed with regards to fantasy statistic magnitude, amplitude, frequency, etc. betting aspects of a fantasy team used in online fantasy betting can be used to selectively generate clips, windows W, buffers B, and so forth as well as selectively notifying the user of the fantasy event, in this instance being a fantasy betting event. The notifications supplied to the user can also indicate a type of event as previously discussed. The type of fantasy event can be color coded by the displayed notification and the level of intrusiveness of the notification can likewise indicate the setting or extent of the event associated thereto.

A fantasy event window W of the digital video recording is identified and associated with the fantasy event (or multiple fantasy events). The fantasy event window W (e.g. a fantasy clip) can be inserted or associated indices into the digital video data, a data file associated and indexed with the digital video data, and/or the digital video data can be clipped to create a fantasy event digital video file (e.g. a recap or buffer). In the instance of a fantasy event digital video file, the file may be stored elsewhere (e.g. uploaded to a cloud or other network connected buffer) and associated with attributes of the fantasy event. For example, the fantasy event clip can have digital descriptive data associated thereto. The digital descriptive data may be used functionally to organize the fantasy event clips. The digital descriptive data may include the magnitude of the fantasy event associated with the fantasy event clip. The digital descriptive data may also include a real-life athlete, team, league, or sport associated with the fantasy event clip. The digital descriptive data may also include a fantasy team owner, fantasy league, fantasy team player, fantasy team competitor or other fantasy-related attribute associated with the fantasy event clip.

Figure 5:
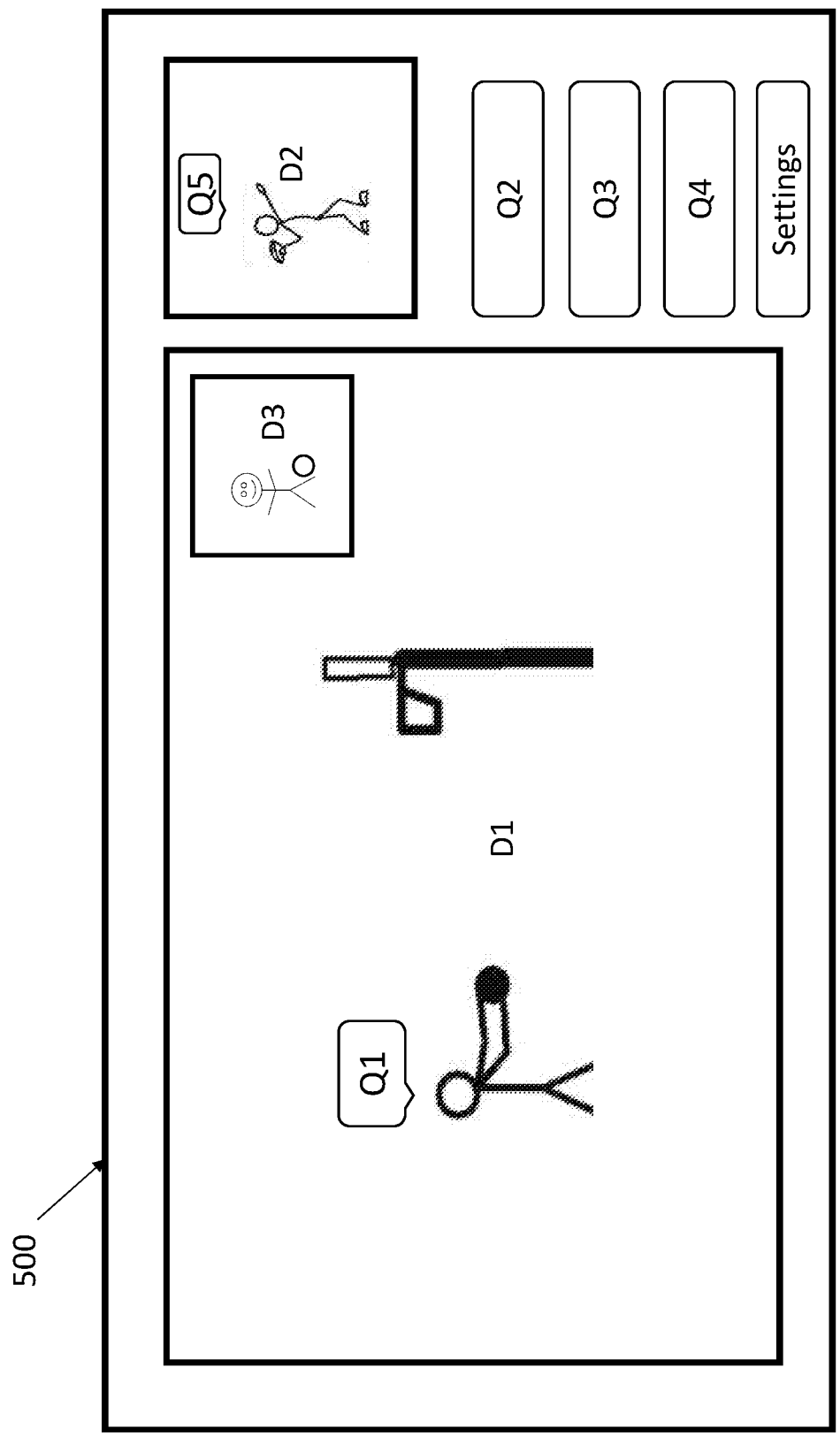
FIG. 5 illustrates a television including fantasy features.

Thus, the real-life fantasy event is identified and associated with a fantasy window W of digital recorded media including digital video and/or audio data. As illustrated in FIG. 5, a notification (e.g. Q1-Q6) can be presented to the fantasy team owner or a direct competitor of the fantasy team owner in the fantasy league. In one embodiment, the notification can be a pop-up on a television 500 screen being viewed by the fantasy team owner as illustrated. The fantasy team owner can be watching the same or a different real-life broadcast of the real-life sports event as the fantasy event occurs. The fantasy team owner can be watching the real-life sports event on a different channel but simultaneous with the occurrence of the fantasy event on the other channel. Or the fantasy team owner can be watching the same real-life sports event within which the fantasy event occurs.

The television 500 screen can include a main display D1 a first sub-window D2 and a third sub-window D3. The sub-windows can be displayed within another display screen, such as D3 within D1 as illustrated, or the sub-windows can be displayed outside of the other screens or in a navigation portion of the display screen as illustrated in the case of sub-window D2.

Referring to FIG. 6 which illustrates a graphical user interface of a portable device 600 used to control navigation and display of fantasy information on the television 500. The portable device 600 including the graphical user interface can be considered a fantasy remote control for controlling the display of the fantasy information on the television 500. The fantasy remote control 600 (e.g. a cell phone or tablet) can include selectable virtual buttons that can also bring down additional search and display criteria. The display of virtual buttons on the portable device 600 and options on the television 500 can be coordinated such that they interactively receive and communicate commands from the user. The virtual buttons displayed on the portable device can be directed using swipe gestures. The virtual buttons can also include certain tap consistency and intensity instruction and sense patterns to receive the intended control by the user to manipulate the display of fantasy event windows on the television 500.

For example, in response to a fantasy notification Q, the user can drag the notification Q into a display window D of the portable device thereby instructing the television 500 to display the associated fantasy event within the display window of the television 500. The user can also double tap or otherwise instruct the portable fantasy remote device 600 to enlarge a particular window or replace one window W with the video window displayed by another. The movement of instructions can be illuminated by the portable device 600 such that the swipe gestures of the user on the portable device 600 are illustrated on a correspondingly visually appreciated manner on the television 500. In this way, the user can select or delete notifications. The user can also create custom recaps by selecting certain windows for inclusion within a custom recap similar to that previously discussed herein. Thus, the creation of the recap can be an interactive process by the user as the various windows are view related to fantasy events. The various windows can also be currently occurring real-life events including fantasy events therein where the user is presented with the option of viewing and/or including certain fantasy events in a fantasy recap.

Upon being notified of the fantasy event, for example by a pop-up on the television 500 being watched by the fantasy team owner, the fantasy team owner is allowed to select the notification pop-up. Upon selection of the notification Q pop-up, the fantasy team owner is allowed to view the fantasy clip of digital video associated with the fantasy event. The fantasy event notification Q can include some text describing the fantasy event as previously discussed and may, or may not, be displayed to the fantasy owner based on the magnitude, type, and other aspects of the fantasy event previously described. And, the fantasy team owner can have the ability to adjust the fantasy event attribute notification settings according to any of these attributes.

The fantasy team notifications Q can be displayed for selection or automatically displayed. The notification Q may be automatically displayed with automatic subsequent display of the fantasy event clip but for a selection by the fantasy team owner directing the computing system managing the notification and display of fantasy information and clips not to display the fantasy clip.

Display of the fantasy clip W can be within a sub-window D of the television 500 or other multimedia device (e.g. 600) upon which the fantasy team owner is watching. The fantasy team owner can view the fantasy clip along with fantasy data simultaneously related to the fantasy event. The fantasy clip displaying video of the fantasy event can pop-up upon the screen of the fantasy team owner in the sub-window D2 or D3. The sub-window D2 or D3 may include a relatively smaller sub-window D3 within the television 500 main display D1 being viewed by the fantasy team owner or an adjacent sub-window D2 as illustrated. The smaller sub-window D3 or D2 can be less than half of the full display screen D1 of the television 500 or other multi-media device being viewed by the fantasy team owner. The smaller sub-window(s) is often less than a quadrant (¼) of the screen and is preferably less than $\frac{1}{16}^{th}$ of the screen D1 of the television 500 as the size of televisions continue to increase enabling the use of such one, multiple, or many sub-windows D3 on the same display screen D1.

The fantasy event notification Q can also be displayed along with other fantasy event notifications Q. The display of multiple fantasy event notifications Q can be simultaneously displayed and the display of multiple fantasy event notifications Q can be organized according to the fantasy event attributes. For example, the multiple fantasy event notifications Q can be displayed and organized according to real-life time of occurrence of the fantasy event. The organization of the multiple fantasy event notifications Q can be according to a fantasy point magnitude associated with the fantasy event. Thus, a first fantasy event notification Q can be presented above a later-in-time in real-life of a second fantasy event notification Q. Similarly, a higher in magnitude fantasy event can be displayed above a lower in magnitude fantasy event notification Q. Upon selection of the fantasy notification Q on the television, or other multi-media device (e.g. 600), the fantasy team owner is presented with the fantasy event clip W showing the fantasy event. Display of the fantasy clip W can be provided within a television screen being viewed by the fantasy team owner. The fantasy clip W can be displayed within a perimeter bounding the fantasy notification Q. Or, the fantasy notification can be a relatively smaller in-screen window D3 or D2 that is enlarged upon selection to display the fantasy event clip W which can be enabled by selection using the portable device 600 such as a cell phone.

Fantasy event notifications Q can also be organized according to a fantasy league setting. For example, the fantasy event notifications Q can be displayed only according to a current fantasy matchup associated with the particular fantasy team owner. The fantasy event notifications Q can also be organized by "toggles" or "tabs" between categories of notifications. The categories can be different fantasy team leagues associated with the same fantasy team owner. Where a television is viewed by multiple different fantasy team owners, the fantasy notification Q organization can be selected and set up for each individual fantasy team owner and/or different viewers of the television.

The fantasy team notifications Q can also be organized to an intrusiveness of the notifications. The intrusiveness of the notifications Q allowed can be selectable by the fantasy team owner. For example, if the real-life television broadcast is of particular interest to the fantasy team owner and a lower level of fantasy event notifications Q are desired, the fantasy team owner can select a request for a lower level of fantasy event notification Q. The lower level of fantasy event notification can be related to a lower level of frequency or size of notification as illustrated in FIG. 6, for example.

The lower level of notification Q can be associated with advertising presented with the real-time broadcast or with the fantasy event notification(s) Q. The lower level of intrusiveness can be associated with a "screen real estate" of the viewed television or other multimedia device. The screen real estate can represent the entire screen and a portion thereof can represent that taken by the notification Q and/or advertising.

The fantasy notification Q and/or advertising display real estate can be reduced upon selection by the viewer, such as the fantasy team owner. The fantasy team owner may "request" a temporary attenuation of the advertising or notifications so as to be less intrusive during a particularly important or interesting portion of the event show or real-life broadcast stream. As such, these temporary settings can take effect for a defined duration, such as 5 or 10 minutes. Then, upon the lapse of that time frame, the normal level of notification and/or advertising can regain. In some instance, such as advertising, the viewer may agree to a relatively increased level of advertising or advertising intrusiveness type after the temporarily lower level is requested.

Display of the fantasy event can also be coordinated with separate electronic devices. For example, when a fantasy event notification Q is selected a fantasy event clip can be displayed on a mobile phone or tablet associated with the television. The fantasy event clip can be sent or stored on the separate electronic device or stored in memory thereon. The fantasy event notification Q can also be received using the mobile device and the mobile device can be used to select the fantasy notification Q and display the fantasy event on the television 500. The fantasy notification Q of the fantasy event can be sent to the mobile device 600 and the mobile device 600 can display the fantasy notification Q which can be coordinated with the smart television 500 to control display of the fantasy event on the television 500.

The mobile device 600 can display a virtual controller as illustrated for controlling the television 500. The virtual controller 600 can be displayed on the mobile device for controlling the television with virtual knobs, dials, buttons, etc. The virtual television controller displayed on the mobile device 600 can be in communication with the television via Blue Tooth or WiFi communication.

In some embodiments the virtual television controller displayed on the mobile device 600 can be customized by the user. The user can use a virtual display customization tool to reorganize the virtual display of the controller on the mobile device 600. For example, the layout of the controller for the television 500 can be reorganized for the type of applications used by the smart television 500 that can be coordinated with the applications resident on the mobile device 600. The mobile device 600 can include tabs for navigating between different virtual controllers displayed on the mobile device 600.

The virtual controller layout design GUI can include a virtual tool for relocating portions of the virtual controller on the display of the mobile device 600. The controller can include sub-windows therein that display available media and a list of fantasy events associated with fantasy clips W. The virtual controller can include features defining whether the default display settings are associated with the television 500, the mobile cellular phone 600, a tablet, computer, etc. Upon selection of the fantasy setting using the virtual controller of the mobile device 600 the fantasy clip W is displayed according to the settings thereof. The virtual controller an include a controller setting for the television, a DVR, a TIVO, a game console, internet navigation, a fantasy league application or webpage, a custom fantasy betting web page or application, and a virtual controller for navigating the fantasy clips, events, associated leagues, teams, and fantasy recaps and each of these functions can be associated with a virtual controller layout, which can be interactive with the other virtual controllers and "toggled" there between according to a virtual controller hierarchy and "navigation tree".

A virtual fantasy graphical user interface can include a top level GUI with a navigation tree layout display. This fantasy graphical user interface can include a notification window, a fantasy league window, a live broadcast window, and a fantasy event clip window. As information in each of these windows is updated the updates are displayed to the user using this top-level fantasy graphical user interface and virtual controller of the device 600.

For example, in the live broadcast window, current, future, and past live sports events and the broadcasts associated thereto can be displayed for viewing and/or selection by the user. The live broadcast window can be in communication with the television 500 and redirect the display of live broadcasts received by the television 500. The live broadcast window can display future broadcasts and can include control of a digital video or multimedia recording device (e.g. 430). The recordings can include updated indexing and/or advertising as disclosed herein. The recordings can be associated with a temporary storage device (e.g. 430) of the smart television 500 or a stand-alone or remote storage device such as a cloud storage device (e.g. 410).

The live broadcast window can display, in coordinate with, the fantasy event window to list or provide notification of the occurrence of fantasy events and the availability of the fantasy clips associated thereto. The fantasy events can be provided in a resolution and/or recording format that is downgraded or upgraded in quality and size based on the device upon which it is displayed. The video can also be assigned a relative priority over the audio until the higher quality video is made available or updated in the digital video recording made available. As referred to herein a digital video recording can also include audio, but has at least digital video data recorded.

The page can also be related to fantasy events in a yearly fantasy league, a weekly fantasy league or a fantasy online betting application. For example, a FanDuel application can be linked to NFL cable or broadcasting channels application that can be linked to a fantasy league using a Yahoo or CBS or some other source.

According to some embodiments, a "dwindling" buffer B can be implemented as previously mentioned. For example, in a first embodiment, the buffer B of storage media may be set to a capacity. Memory can be random access memory that can be read or written to and from. Data can be written to the memory buffer B and deleted from the memory or overwritten. As data is written to the memory the capacity of the available writeable memory can be lessened. As data is deleted therefrom or marked/identified to be overwritten thereto, the available capacity for storing new data while retaining the stored data can be increased.

According to some embodiments, a compilation of data can be made and retained thereby decreasing the available data storage capacity for new data to be recorded. As previously disclosed, the compilation may be made from continuously recorded video data and the continuously recorded data can be stored within a portion of the memory that can be defined separate from the compiled portion of the data. The sections of the memory can be defined by a moving partition between a portion of the memory that is assigned for continuous recording of data and a portion of the memory that is assigned for storage of a compilation of recordings that are made from the continuously recorded data.

Several embodiments include a method of indexing a previously digitally recorded program of an audio and video program and can comprise first, downloading the digital recording of the audio and video program. Second, and later, downloading from a server an index of the digital audio and video program to be associated with the digital recording of the audio and video program so as to facilitate navigation of the digital recording of the audio and video program, the second, and later downloading from the server of the index can occur between 1 minute and 1 week later, about 5 minutes, about 30 minutes, about one hour, about one day, or about one week later. Third associating the index to the digital audio and video recording enabling a user of the digitally recorded audio and video program to navigate the digital recording of the audio and video program according to the index. Fourth, enabling the user to navigate the indexed associated digital recording of the audio/video program using the index applied to the digital recording of the audio and video program. The indexing may not be previously predictable prior to recording of the audio and video program as the indexed events or programs may not be previously determined.

The audio and video program can be a sports event and the indexing can be directed to a division of the sports event determined or including by the beginning and/or end of a quarter, period, bout, or half-time event of the sports event. The audio and video program can be a reality show where a certain chapter or segment of the program extends in length longer or shorter than another chapter or segment of the program. In these embodiments the duration of the certain chapter or segment of the reality show might not be previously known. The audio and video program can be a news program where a certain chapter or segment of the news program extends in length longer or shorter than another chapter or segment. In these embodiments the duration of the certain chapter or segment of the news program might not be previously known. The downloading of an audio visual advertising segment can be inserted or supplement the recording while the user navigates from a first indexed segment to a second indexed segment.

The audio and video program can be audio and visually adjusted according to the index. The indexing of the audio and video program can be manually selectable by the user. The indexing of the audio and video program can be viewable and manually approved by the user prior to its application to the program. The indexing of the audio and video program can be automatically or manually determined based on a personal attribute of the user. The indexing of the audio and video program can be determined and selected based on the age of the user. The indexing of the audio and video program can be determined based on a special need of the user such as a medical need or specific interest thereof. The audio visual advertisement can be presented in a sub-window as the user navigates from the first indexed segment to the second indexed segment. The audio visual advertisement can be presented in a manner that is entirely secondary to the display of the original audio visual program as the user navigates from the first indexed segment to the second indexed segment. The audio visual advertisement can be presented to the user via an email, messaging, or text media. The audio visual advertisement can be presented in a manner that is entirely secondary to the display of the original audio visual program as the user navigates from the first indexed segment to the second indexed segment. The audio visual advertisement can be presented in a social media once agreed upon by the user. The audio visual advertisement can be presented in a manner that does not disturb the time-shifting aspect of the forwarding navigation from the first indexed segment to the second indexed segment. The audio visual advertisement can be subsequently updated based on a georeferenced location of the user. The subsequent updating of the audio visual advertisement based on the georeferenced location of the user can be conducted between 1 minute and 1 week later, about 5 minutes, about 30 minutes, about one hour, about one day, or about one week later, one month later, or more depending on the circumstances. The audio visual advertisement can be subsequently updated based on a fight ticket aspect based on bouts or divisions of the fight. An apparatus or computer readable medium can be configured to perform the aspects discussed herein. A server can also be configured to provide the data to the DVR as discussed herein.

One aspect of a DVR and DVR server that some embodiments addresses is that content is generally recorded before being viewed. And, when viewed, the content is not indexed, such as in a movie DVD or other aspect where you can navigate from section to section. For example in a sports game recording it would be impossible to index the sports game prior to its recording as it is impossible to predict when a first period, quarter, or other variable portion were to begin and end; and, it is impossible to selectively navigate around advertising, commentary, pre-shows, post-shows, etc. there between, for example. Moreover, in many TV shows the beginning and ending of a chapter or segment is not always predictable. For example, in Shark Tank there may be one episode portion of a first proposed product proposed that is longer than a second episode portion of a second proposed product proposed. And, currently these DVR recorded shows are not accurately indexed such that a user can manually skip through the recording and other media previously discussed as well as introductions to the cast to reach the next chapter, section, period, or quarter. As such, an ample amount of user time is used to scan, or time shift, to another desired location instead of skip, be provided with an understandable index or otherwise understand the program's content.

Moreover, there might be a news program that is not properly indexed. For example, 60 Minutes, Frontline, Nova, Nightline, Local News, or 20/20 may not have an indexed navigatable criteria to manually, or automatically, navigate the program after the program is recorded. According to some embodiments disclosed herein a news program can also be indexed. Importantly to some embodiments, the indexing of such program is different from post-recording a live program as most news programs are at least partially prerecorded making indexing possible. However, pre-indexing a lived recorded program on a DVR is clearly difficult, if not impossible, depending on the timeframe.

Thus, a user can benefit from a post-provided adjusted, or indexed, digital audio and video program recorded on a DVR. In addition, a provider of that program can benefit from an increased viewing of that adjusted, or index enabled, navigable program on a subscriber's DVR, such as a TIVO box or other DVR device. For example, a program might have multiple sections of a sports event with various fantasy events therein, chapters of a story, sections of a movie, or sections of a reality show, such as Shark Tank or other reality show, for example. And, a subscriber might enjoy having those sections of a digitally recorded (DVR'd) recording indexed and navegatable. Such subscriber might also be charged an additional subscription for such service. That is, they can be charged, or receive advertisement, to skip to the desired location within the DVR'd recording as opposed to scanning through the program. Moreover, a fantasy index map, or guide, can be visually provided to the user to inform them of the customized fantasy event indexing and content locations of the media previously recorded or presented. As such, the user not only receives a recording of the DVR'd media, but also a visual fantasy event index or content map thereof. And, as discussed, the mapping and indexing can be customized particularly to the personal user in some embodiments based on preferences, previous usage, age, gender, interests, and historical background of program interest.

In addition, the provider of that program, or a person associated thereto, can insert fantasy sport event-related advertisement(s) into the program at the indexed location(s) to further interest the user or provide profitable media therein. In further addition, a selectable or preferred version of the media may be provided by such indexing in a DVR recording such as for children, elderly, certain interest, or special needs users. In further addition, technological means may be used to provide the advertisement without disrupting the viewing of the media such as a second screen to simultaneously display the advertisement media, redirecting media to an email or text associated with the user.

The advertisement, or supplemental media generated, can also be provided in a small window so as not to constitute a derivative work for purposes of copyright infringement possible concerns. For example, as the user time-shifts by fast forwarding, the user can be provided with real-time entertainment advertising in a reduced, tangential, or alternative means so as to leave the original media in-place as far as a DVR is concerned.

Moreover, the inserted advertisement media can be updated in the DVR post-recording. For example, an advertisement between index A inserted between period 1 and period 2 of a hockey game can be modified in a DVR recording from MCDONALDS to IN AND OUT BURGER either in the same or a subsequent game and such insertion can be based on a fantasy event, fantasy manager, or other fantasy competition data. In addition, the advertisement in a DVR recording in a geographic, or specific location can be changed likewise. For example, FIVE GUYS restaurant might be well received in one location such as Washington, D.C., (Location A) but not another such as in Salt Lake City, Utah (Location B). As a result, a FIVE GUYS advertisement can be inserted at an indexed location 1 for residents of Washington D.C. (Location A) and a BURGER KING advertisement can be inserted into the DVR recording at index 2 (Location B) for another location.

Thus, for this example, there can be one or more of: (1) a fantasy index insertion into a DVR recording. There can also be (2) advertising provided at that fantasy indexed DVR recording. There can also be (3) georeferenced, age, preference, selective, selection of advertising provided at that fantasy indexed location. There can also be (4) user selection criteria of fantasy competition related advertising provided at that fantasy indexed location. Importantly, the base for such options is centered on an inserted fantasy index to a DVR'd program outside of the original program itself. And, the program is not a hard source such as a DVD or such as the product sold by Cleanflicks. Rather, it exists generally in software, content downloaded and updated, or a copy downloaded via a DVR including metadata, internal tags, a time indexed adjacent media that supplements the program, or other indicators therein, or an external indicator map downloaded and downloaded therein when requested by the map therein.

The index insertion can be manually, or automatically inserted. For example, for parental controls, preferred controls, preferential controls, or elderly controls, an index can be inserted manually by a publisher. Moreover, auto recognition can be used or a studio might issue insertion of an index for excluding a portion of media recorded by a DVR or based on a preference of the particular viewer.

Moreover, modification of the DVR recording may be subsequently made by the distributor. For example, if certain content of the recording is determined to be inappropriate the distributor can replace that portion using an index or map thereof. And, if a certain portion is deemed to violate a law such as copyright or privacy laws such modification can be automatically made after the recording is distributed and recorded.

As further addition, the advertisement(s) can be selectable in the DVR'd media to allow the user to automatically receive online advertisement incentive or to further investigate or purchase a product associated with the advertisement(s). For example, at the DVR indexed advertisement area, a user selectable portion can be provided for the user to request further information or promotions. This may redirect the viewer/user to another online distributable media. The online distributable media can ask the user for additional information, such as an email, and provide an incentive to further pursue a product.

Again, and importantly, certain embodiments of the invention relate to a DVR recording. The ability to be interactively and continuously connected to the recording and provide an interactive and custom interface to the media is an important aspect of the invention. The user can be provided with a custom or preferable index to the media such as indexes to the media not previously provided. The user can also be provided with customized advertising. The advertising can be customized to the user's preferences, geographic location, gender, age, previous or current interests, etc. However the indexing and advertisements are accomplished using a DVR recording that may or may not be updated over time.

For example, a user might record a fighting ticket, which might include several matches. By indexing the recording, the user can skip to the headliner or other match of most interest instead of "fast forwarding" to the desired portion. As a consequence, the user might be required to view some advertisement. Nevertheless, the user was able to save time and view the desired content and the provider of the media or a third party was able to provide some advertisement value.

Figure 7:
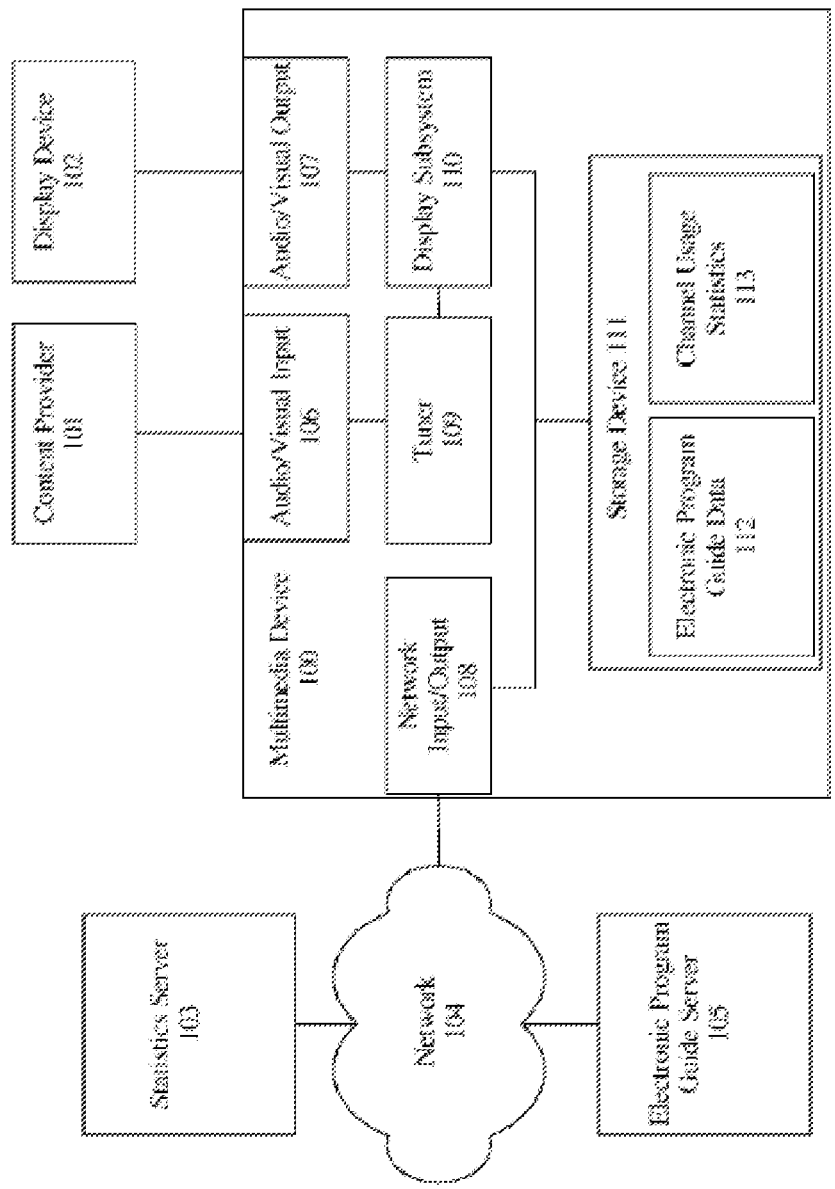
FIG. 7 illustrates an example environment upon which embodiments of the present invention may be implemented.

Referring to U.S. Publication 2014/0104495, the contents of which are hereby incorporated by reference in their entirety as showing components of a conventional DVR of which may be capable of being configured to practice some of the features of this invention disclosed and claimed herein. FIG. 7 illustrates an example environment upon which one or more embodiments of the present invention may be implemented, for example. Thus, it is admitted that DVRs, televisions, movies, recorded events and programs, and servers connected to the internet are not unknown devices as discussed hereinafter, however, not as claimed and discussed previously.

FIG. 7 shows a multimedia device 100, a content provider 101, a display device 102, a statistics server 103, a network 104, and an EPG server 105. The multimedia device 100 includes any of: an audio/visual input 106, an audio/visual output 107, a network input/output 108, a tuner 109, a display subsystem 110, and a storage device 111. The storage device 111 stores EPG data 112 and channel usage statistics 113. The EPG data 112 may be stored in storage device 111 in any form, e.g., database, linked list, flat file, or any type of data structure. Each of these components are presented to clarify the functionalities described herein and may not be necessary to implement the invention. Furthermore, components not shown in FIG. 7 may also be used to perform the functionalities described herein.

Multimedia device 100 represents any device capable of processing or presenting multimedia content. For example, multimedia device 100 may represent a set top box, such as a DVR, thin client, etc.

In an embodiment, audio/visual input 106 is any component that allows receipt of content from content provider 101. For example, audio/visual input 106 may represent a cable receiver, a radio receiver, or a satellite dish.

In an embodiment, content provider 101 represents any source from which multimedia device 100 may derive content. For example, content provider 101 may represent a local broadcaster that streams media content to multimedia device 100 over one or more channels or over the Internet. In one embodiment, content provider 101 transmits content over one or more analog frequencies. However, in another embodiment, content provider 101 transmits content in the form of a digital stream, using encodings such as MPEG-2, MPEG-4, etc.

In an embodiment, tuner 109 is any hardware or software component that allows multimedia device 100 to select content streamed by content provider 101 over a particular channel. In one embodiment, tuner 109 changes to a particular channel by tuning to an analog frequency associated with the particular channel. In another embodiment, tuner 109 changes to a particular channel by demultiplexing a digital stream provided by content provider 101. For example, the digital stream may be multiplexed using techniques such as statistical multiplexing, code division multiplexing, time division multiplex, or any other multiplexing techniques. Thus, depending on the embodiment, tuner 109 may rely upon tags, codes, time markers, or other features of the digital stream to select content associated with a particular channel. In an embodiment, after tuner 109 selects content from a particular channel, the tuner 109 provides the content to display subsystem 110.

In an embodiment, display subsystem 110 represents any combination of one or more hardware or software components that processes and transfers content to display device 102 through audio/visual output 107. In some embodiments, display subsystem 110 is capable of modifying the content provided by tuner 109 before transferring the content to display device 102. For example, display subsystem 110 may insert notifications, logos, advertisements, menu overlays, and other graphical elements into the content provided by tuner 109. In other embodiments, the graphical elements may be displayed instead of the content provided from tuner 109. For example, during a pause for a commercial break or to display a menu that covers the entire display of display device 102, as opposed to being overlaid over the content. In still other embodiments, the content from tuner 109 may be minimized to cover only part of the display of display device 102 with graphical elements inserted into the resulting free space. In an embodiment, the graphical elements used by display subsystem 110 are stored on storage device 111. However, in other embodiments, display subsystem 110 generates the graphical elements from data stored on storage device 111. In an embodiment, display subsystem 110 is the component of multimedia device 100 responsible for providing a view of the EPG data 112 to display device 102 for presentation to a user. In an embodiment, display subsystem 110 sorts through the EPG data 110 and constructs a user interface (UI) which is then provided to display device 102.

In an embodiment, audio/visual output 107 is any component that allows transfer of audio/visual data to display device 102. For example, audio/visual output 107 may represent an RCA connector, DVI, FireWire, Fiber-Optic, HDMI, DisplayPort, etc.

In an embodiment, storage device 111 is any device capable of storing data. For example, storage device 111 may represent a hard drive disk, solid state drive (SSD), random access memory (RAM), a flash drive, other storage devices, and combinations thereof.

In an embodiment, display device 102 is any device capable of displaying multimedia content. For example, display device 102 may be a television set, monitor, etc.

In an embodiment, network 104 represents any combination of one or more local networks, wide area networks, internetworks, service provider networks, etc. Data exchanged over network 104, may be transferred using any number of network layer protocols, such as Internet Protocol (TCP/IP), Multiprotocol Label Switching (MPLS), Asynchronous Transfer Mode (ATM), Frame Relay, etc. Furthermore, in embodiments where network 104 represents a combination of multiple networks, different network layer protocols may be used at each of the underlying networks. In some embodiments, network 104 represents the Internet.

In an embodiment, multimedia device 100 connects to network 104 through network input/output 108. For example, network input/output 108 may include a direct Ethernet connection, a Universal Serial Bus (USB) port for a wired or wireless Ethernet adapter, etc.

In an embodiment, EPG server 105 represents any server capable of providing EPG information to multimedia device 100. In an embodiment, EPG server 105 periodically sends updates to multimedia device 100 for incorporation into EPG data 112. For example, EPG server 105 may, at end of each week, send multimedia device 100 scheduling information related to the programs that will be aired during the next week or, optionally, send multimedia device 100 a notification that an EPG update is available. In an embodiment, incorporation includes updating EPG data 112 with new information or replacing EPG data 112 with new data received from EPG server 105. In other embodiments, rather than EPG server 105 initiating periodic updates, multimedia device 100 periodically requests updates from the EPG server 105.

In some embodiments, multimedia device 100, when receiving an update or independently of the reception of an update from EPG server 105, retrieves advertisements or instructions to play advertisements in association with particular channels or programs. These advertisements, in some embodiments, may be placed by display subsystem 110 into menus associated with those channels or programs. In other embodiments, the advertisements may be added to the content provided by tuner 109 when multimedia device 100 presents the associated channel or program.

In an embodiment, EPG data 112 contains metadata representing channel information. For example, the metadata for each channel may include a channel number, a channel name, a call sign, and a timeline of when programs air on the channel. Furthermore, EPG data 112 may contain metadata specific to particular programs, such as program title, content rating, actors, synopsis, producer, director, episode number (for programs that are episodic), reviews, etc.

In an embodiment, statistics server 103 is any server storing statistics related to channel usage. For example, statistics server 103 may store the frequency with which particular channels are accessed within various geographical areas or demographics. In order to compile these statistics, statistics server 103 may periodically poll for, or receive from, multimedia device 100, or other multimedia devices not depicted in FIG. 7, statistics related to how often particular channels are accessed by the users of each respective multimedia device. Thus, in an embodiment, when a user selects a channel, multimedia device 100 indicates the selection within channel usage statistics 113. Examples of information that may be stored within channel usage statistics 113 include channel number, channel name, call sign, the program playing at the time of selection, user profile data, the length of time the channel or program was viewed, timestamp, etc. In some embodiments, the information contained within channel usage statistics 113 may be anonymized before or after being transferred to statistics server 103 in order to protect user privacy. In an alternative embodiment, rather than statistics server 103 performing polling, each respective multimedia device may periodically report out collected statistics to statistics server 103.

In an embodiment, once statistics server 103 receives channel usage data from one or more multimedia devices, statistics server 103 analyzes the data for trends such as popular channels within geographical areas, demographics, or other any other type of grouping criteria. Statistics server 103 can then make the statistics related to the aforementioned trends available to multimedia device 100. Thus, multimedia device 100 may retrieve the trend statistics from statistics server 103 and store them within channel usage statistics 113 along with any independently collected statistics. For example, the statistics retrieved from statistics server 103 may relate to general groups of users whereas the statistics collected locally may relate to the specific users of multimedia device 100. In one embodiment, multimedia device 100 employs channel usage statistics 113 to determine which graphical elements (e.g. advertisements, etc.) should be displayed to a user. Furthermore, as will be described in more detail in later sections, multimedia device 100 in some embodiments uses channel usage statistics 113 to determine the order to present channels in various menus related to channel tuning and the display of EPG data 112.

3.0 Displaying the Electronic Program Guide

In an embodiment, multimedia device 100 displays a user interface (UI) presenting at least a portion of the EPG data 112 in response to receiving user input. For example, the user may utilize a remote that has a "guide" button that can be used to instruct the multimedia device 100 to display the EPG data 112 UI. As another example, the multimedia device 100 may present a menu with an option for displaying the EPG data 112 UI. In other embodiments, the multimedia device 100 displays the EPG data 112 UI automatically. For example, multimedia device 100 may display the EPG data 112 UI in response to the multimedia device 100 or the display device 102 being activated by a user. As a result, when a user begins a session of watching programs using multimedia device 100, the user is initially presented with EPG data 112 UI.

In some cases, EPG data 112 may contain information for a large number of channels, potentially hundreds or even thousands of channels. As a result, display device 102 may not be able to display all the information contained within EPG data 112 simultaneously without significantly impacting the readability of the information. Thus, according to an embodiment, the information contained within EPG data 112 is displayed in pages, each of which contains information for a subset of the channels represented within EPG data 112. In addition, pages may further save space on the display of display device 102 by including only a subset of the information available for each channel.

FIG. 8 illustrates an example page 200 of a UI for EPG data 112 according to an embodiment.

Page 200 is depicted within FIG. 8 in tabular format, with the rows representing each channel and the columns representing one or more informational elements for each channel. However, in other embodiments, page 200 may be displayed in formats other than a table.

The informational elements contained by page 200 include channel names 201, channel numbers 202, and one or more selectable items 203 representing the programs A1-H4 that have aired, are airing, or will be aired on each channel during time frames 204. Although each of the time frames 204, depicted in FIG. 8 represent a half hour interval, in other embodiments the time frames 204 may represent any other arbitrary interval or any combination of arbitrary intervals. For example, program A1 is depicted as airing on channel AAA at 8:00 PM. In other embodiments, the order and content of the informational elements may differ from the depiction of page 200.

In an embodiment, selectable items 203 display information for each of programs A1-H4 including program name, genre, content rating, and/or a short description of the program. Furthermore, users may select one of the selectable items to display additional information from EPG data 112 related to the corresponding program. For example, the additional information may include a more complete description of the program, the director of the program, the main actors of the program, a synopsis of the episode (should the program be episodic), production date, reviews of the program, etc. Furthermore, in the case where multimedia device 100 is a DVR or otherwise has the ability to record programs, the user may be presented with an option to schedule the program for recording. In other embodiments, the information displayed by each selectable item and/or displayed in response to selecting a selectable item may differ from the aforementioned examples.

In an embodiment, users are able to select a selectable item using a "pointer" oriented input device, such as a mouse or motion sensing controller Thus, the user orients the pointer over the desired selectable item and "clicks" to select the selectable item. In other embodiments, users select a selectable item using an input device with directional buttons, such as a remote control. Thus, multimedia device 100 navigates the user to an initial selectable item, which may be highlighted or otherwise visually distinguished from the other selectable items displayed on page 200. Then, utilizing the directional buttons, the user can navigate to adjacent selectable items, with the multimedia device 100 maintaining the highlighting over the selectable item to which the user is currently navigated. Once the user has navigated to a desired selectable item, the user can indicate selection by, for example, pressing a "select" button on the input device.

In an embodiment, multimedia device 100 allows the user to "scroll" through the channels represented within the EPG data 112. In one embodiment, the EPG data 112 may list the channels in a particular order, such as ascending or descending order by channel number. Initially, page 200 displays information for a particular number of channels corresponding to a segment of the list. The segment may be the top of the list, the bottom of the list, or an intermediate portion of the list. When the user attempts to navigate beyond the top-most or bottom-most boundary of page 200, multimedia device 100 shifts the segment further up or further down the list respectively (with or without wrap-around) to change the channels that are being displayed. For example, page 200 is depicted as containing information for channels 22-29. Should the user attempt to navigate upwards from the row representing channel "22", page 200 may be updated to display information for channels 21-28. Similarly, should the user attempt to navigate downwards from the row representing channel "29", page 200 may be updated to display information for channels 23-30. In other embodiments, multimedia device 100 may allow the user to "page up" or "page down", shifting the segment further up or down the list by more than one channel. In an embodiment, the number of channels shifted is based on the number of channels displayed on page 200. For example, in response to receiving user input to "page up" from page 200, page 200 may be updated to display information for channels 14-21.

In an embodiment, multimedia device 100 allows the user to "scroll" through the informational items available for each channel. In one embodiment, when the user attempts to navigate further to the right than the right-most boundary of the selectable items 203 on page 200, multimedia device 100 updates page 200 to advance the time frames that are currently being displayed. For example, should the user attempt to navigate further right from the column representing 9:30 pm, page 200 may be updated to display the programs playing from 8:30-10:30 PM. Similarly, when the user attempts to navigate further to the left than the left-most boundary of the selectable items on 203 on page 200, multimedia device 100 updates page 200 to display programs playing during a previous time frame. For example, should the user attempt to navigate further left from the column representing 8:00, page 200 may be updated to display the programs playing from 7:30-9:30 PM.

In some embodiments, multimedia device 100 tunes to a channel displayed on page 200. In one embodiment, multimedia device 100, in response to receiving user input instructing to tune to a channel, tunes to the channel associated with the row to which the user is currently navigated. For example, if a user is navigated to "Program F1" at the time user input is received, multimedia device 100 tunes to channel 58. In another embodiment, multimedia device 100 displays a menu option when one of the selectable items 403 is selected which gives the user the option to tune to the channel associated with that selectable item. In yet another embodiment, page 200 includes a selectable item that, when selected by the user, causes the multimedia device 100 to tune to the associated channel.

Figure 9:
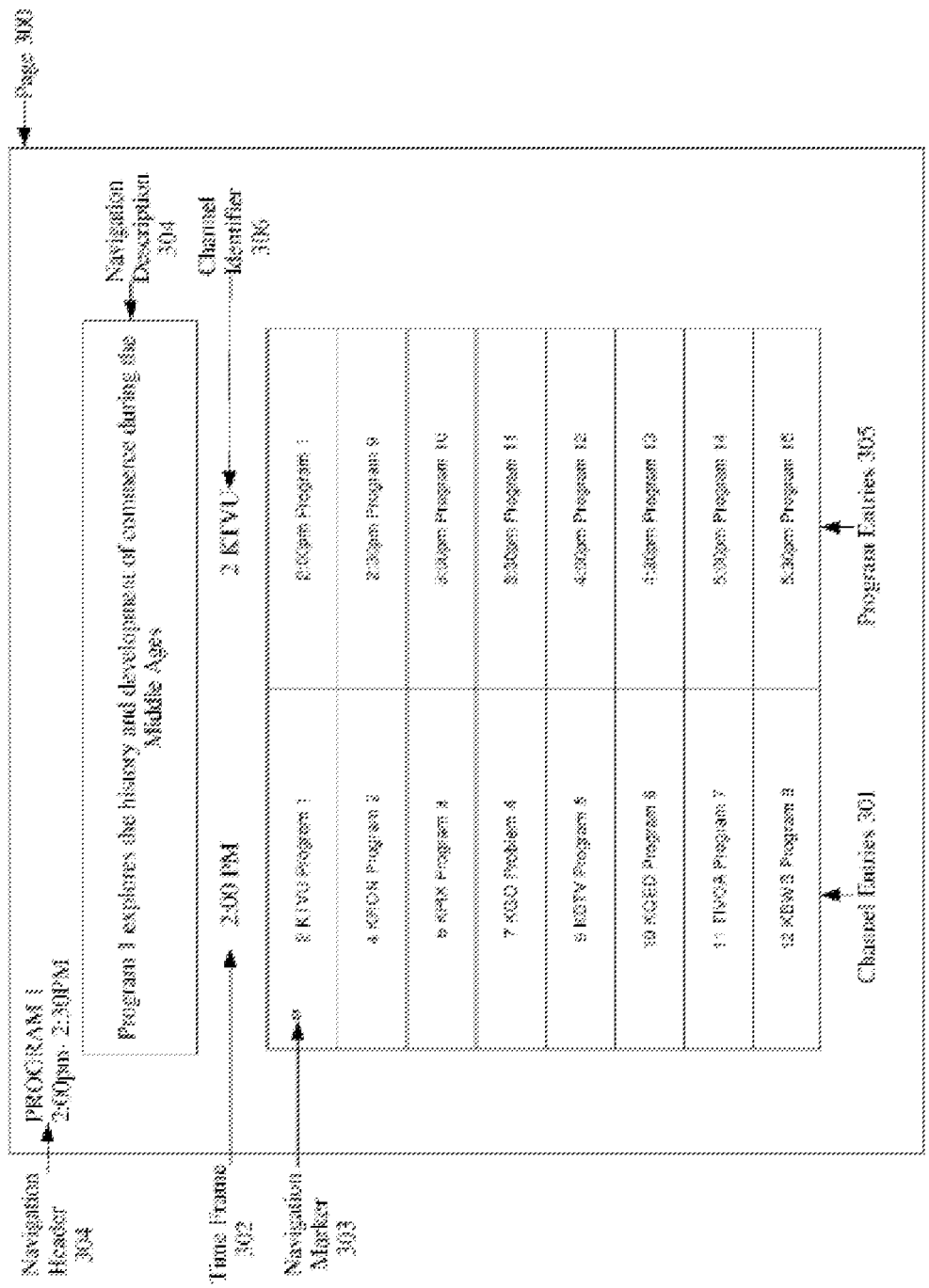
FIG. 9 illustrates an alternative example page of a UI screen for EPG data according to an embodiment.

FIG. 9 illustrates an alternative display for a page 300 of the EPG data 112 UI according to an embodiment. In FIG. 9, channel entries 301 represent a list of programs airing on a subset of the channels during timeframe 302. Each channel entry of channel entries 301 is associated with a particular channel, a particular program, and/or a particular time and displays information including any of channel number, channel name, call sign, program name, time frame, etc. Similar to page 200 of FIG. 8, the channel entries 301 can be scrolled by multimedia device 100 in response to receiving user input navigating through the channel entries 301. In addition, multimedia device 100 visually distinguishes the channel entry to which the user is currently navigated with navigation marker 303. In other embodiments, rather than using navigation marker 303, multimedia device 100 may visually distinguish the channel entry to which the user is currently navigated using other techniques, such as highlighting the channel entry, displaying the channel entry in a different font, adjusting the channel entry's size, etc.

Navigation header 304 displays information for the program associated with the channel entry to which the user is currently navigated. For example, navigation header 304 may display the program's name and the time frame during which the program airs. In addition, program description 304 contains a short description of the program. When the user is navigated to a particular channel entry, multimedia device 100 displays a list of program entries 305, representing programs airing on the associated channel during previous, current, and/or future time frames. In some embodiments, program entries 305 display the same types of information as channel entries 301. However, in other embodiments, program entries 305 display different types of information than channel entries 301. For example, in the embodiment of FIG. 3, each program entry displays a program name and a time during which the program airs whereas each channel entry displays a program name, channel name, and channel number. In the illustration of FIG. 3, the user is currently navigated to the channel entry associated with "Program 1" airing on channel "KTVU" at 2:00 pm. Thus, program entries 305 contain one or more entries representing the programs associated with channel "KTVU" that are viewable in whole or in part during the period 2:00 pm-5:30 pm. In an embodiment, multimedia device 100, in response to user input, scrolls through program entries 305 and displays additional program entries representing previous or subsequent timeframes beyond those currently displayed.

In an embodiment, multimedia device 100 determines whether the user is scrolling through channel entries 301 or program entries 305 based on operating mode. For example, multimedia device 100 may begin by default in an operating mode that assumes input indicating to scroll should be interpreted as scrolling through channel entries 301. However, should multimedia device 100 receive a particular type of input, multimedia device 100 changes to an operating mode that interprets future input indicating to scroll as scrolling through program entries 305. Similarly, in response to receiving another type of input, multimedia device 100 returns to the original operating mode. For example, assuming a directional input device, a user may scroll by submitting input indicating "up" or "down". Thus, initially, "up" and "down" are interpreted as scrolling through channel entries 301. In response to receiving input indicating "right" multimedia device 100 changes to an operational mode that interprets future "up" and "down" input as scrolling through program entries 305. Then, in response to receiving input indicating "left", multimedia device 100 returns to the original operating mode and interprets future "up" and "down" input as scrolling through channel entries 301. In other embodiments, the scrolling input and the input that causes multimedia device 100 to change modes may differ from the above example. Furthermore, in some embodiments, the same type of input may be used to switch between operational modes, as opposed to different inputs being used to switch back and forth as described in the example above.

In an embodiment, in response to user input selecting an entry from channel entries 301 or program entries 305, multimedia device 100 displays additional information related to the selected entry. For example, the additional information may include a more detailed description of the associated program, content ratings, actors, directors, producers, reviews, and/or options to view the associated program or schedule the associated program for recording.

In an embodiment, multimedia device 100 displays the EPG data 112 UI in accordance with the techniques described in U.S. Pat. No. 6,642,939, "Multimedia Schedule Presentation System", owned by the Applicants, the entire contents of which is incorporated by reference for all purposes as though fully stated herein.

Although the following descriptions and examples will be described primarily in reference to the page format illustrated in FIG. 8, the same techniques may be applied in other embodiments to different page formats, such as the page format illustrated in FIG. 9, the UI described in "Multimedia Schedule Presentation System", etc.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

An application program (app or application for short) is a computer program designed to perform a group of coordinated functions, tasks, or activities for the benefit of the user. Examples of an application include a word processor, a spreadsheet, an accounting application, a web browser, a media player, an aeronautical flight simulator, a console game or a photo editor. The collective noun application software refers to all applications collectively. This contrasts with system software, which is mainly involved with running the computer.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method of indexing and associating two or more video transmissions of two or more different real-life sport events based on fantasy game events occurring therein, the events being related to two different players of a fantasy team, comprising:
    receiving a first video transmission of a first real-life sport event associated with a first fantasy event type while the first real-life sport event occurs in real-life;
    recording the first video transmission of the first real-life sport event while the first real-life sport event occurs in real-life;
    receiving a first fantasy game event signal identifying a first fantasy game event in the first real-life sport event;
    indexing the recording of the first real-life sport event based on the first fantasy game event signal while the first real-life sport event occurs in real-life;
    defining a first recording window of the first fantasy game event including a certain recording time frame prior to the first fantasy event and a certain recording time frame after the occurrence of the first fantasy game event associated with the first type of fantasy event;
    receiving a second video transmission of a second real-life sport event associated with a second fantasy event type while the second real-life sport event occurs in real-life;
    recording the second video transmission of the second real-life sport event while the second real-life sport event occurs in real-life;
    receiving a second fantasy game event signal identifying a second fantasy game event in the second real-life sport event;
    indexing the recording of the second real-life sport event based on the second fantasy game event signal while the second real-life sport event occurs in real-life;
    defining a second recording window of the second fantasy game event including a certain recording time frame prior to the second fantasy event and a certain recording time frame after the occurrence of the second fantasy game event associated with the second type of fantasy event, wherein the second recording window is different from the first recording window based on a difference between the first type of fantasy event of the first fantasy event and the second type of fantasy event of the second fantasy event; and
    associating the index of the recording of the first real-life sport event based on the first fantasy game event signal with the index of the recording of the second real-life sport event based on the second fantasy game event signal based on fantasy drafted players of a common fantasy team performing in the first and second fantasy game events.

2. A method according to claim 1, further comprising:
displaying a first fantasy game event indication based on the first fantasy game event signal received, the first fantasy game event indication describing occurrence of the first fantasy game event during the first real-life sport event.

3. A method according to claim 2, further comprising:
enabling a user to navigate the recording of the first real-life sport event based on the indexing of the first fantasy game event while the first real-life sport event occurs in real-life.

4. A method according to claim 2, further comprising:
displaying a second fantasy game event indication based on the second fantasy game event signal received during display of the first real-life sport event, the second fantasy game event indication describing the occurrence of the second fantasy game event in the second real-life sport event.

5. A method according to claim 4, further comprising allowing a user to navigate from the first real-life recording to the second real-life recording based on the indication describing the occurrence of the second fantasy game event in the second real-life sport event.

6. A method according to claim 1, wherein the first and second real-life events overlap in time in real-life.

7. A method according to claim 1, further comprising:
enabling a user to navigate the recording of the first real-life sport event based on the indexing of the first fantasy game event while the first real-life sport event occurs in real-life.

8. A method according to claim 1, wherein:
the recording of the first real-life sport event occurs at least partially simultaneously in time with the recording of the second real-life sport event.

9. A method according to claim 8, further comprising allowing a user to navigate and view the first recording of the first real-life sport event as the first live broadcast of the first real-life sport event is being recorded.

10. A method according to claim 1, further comprising allowing the user to navigate and view the recording of the first real-life sport event as the first real-life sport event is being indexed.

11. A method according to claim 1, further comprising first alerting the user to occurrence of the first fantasy game event of the first real-life sport event.

12. A method according to claim 11, further comprising allowing the user to selectively navigate and view a first portion of the first recording based on the first indexing related to the first fantasy game event of the first real-life sport event.

13. A method according to claim 11, further comprising second alerting the user to occurrence of the second fantasy game event of the second real-life sport event.

14. A method according to claim 1, further comprising allowing the user to selectively navigate and view a first portion of the second recording based on the second indexing related to the second fantasy game event of the second real-life sport event.

15. A method according to claim 1, wherein the recording of the first real-life sport event includes a time indexed video file and the index of the first real life sport event is also a time indexed file corresponding to the time indexing of the recording of the first real-life sport event.

16. A method according to claim 1 wherein the first index describes a span of time surrounding the fantasy event in recording of the first real life sport event.

17. A method according to claim 1, wherein each fantasy event includes a scoring event associated with fantasy points in the fantasy game.

18. A method according to claim 1, wherein the fantasy event is associated with a scoring magnitude based on a fantasy sports league's fantasy scoring system.

\* \* \* \* \*

Disclaimer

9,602,879 B2 — David Amselem; Yuval Hava, both of Meitar (IL); Adi Shavit; Dana Shavit, both of Mevasseret-Zion (IL). DEVICES, SYSTEMS, METHODS, AND MEDIA FOR DETECTING, INDEXING, AND COMPARING VIDEO SIGNALS FROM A VIDEO DISPLAY IN A BACKGROUND SCENE USING A CAMERA-ENABLED DEVICE. Patent dated March 21, 2017. Disclaimer filed October 9, 2018, by the assignee TVTAK LTD.

Hereby enters this disclaimer to the entire term of all claims in said patent.

*(Official Gazette, April 20, 2021)*